United States Patent [19]
Taniguchi et al.

[11] Patent Number: 5,084,722
[45] Date of Patent: * Jan. 28, 1992

[54] FOCUS CONDITION DETECTING DEVICE

[75] Inventors: Nobuyuki Taniguchi; Toshihiko Karasaki; Hiromu Mukai; Hisashi Tokumaru; Tokuji Ishida, all of Osaka, Japan

[73] Assignee: Minolta Camera Kabushiki Kaisha, Osaka, Japan

[*] Notice: The portion of the term of this patent subsequent to Feb. 20, 2007 has been disclaimed.

[21] Appl. No.: 626,335

[22] Filed: Dec. 13, 1990

Related U.S. Application Data

[63] Continuation of Ser. No. 448,648, Dec. 11, 1989, abandoned, which is a continuation of Ser. No. 193,794, May 13, 1988, Pat. No. 4,903,065.

[30] Foreign Application Priority Data

May 15, 1987 [JP] Japan ................. 62-119200
May 19, 1987 [JP] Japan ................. 62-121481

[51] Int. Cl.$^5$ .............. G03B 13/36; G02B 7/34
[52] U.S. Cl. .................. 354/402; 250/201.8
[58] Field of Search ............ 354/400, 402, 406, 407, 354/408; 250/201.2, 201.8

[56] References Cited

U.S. PATENT DOCUMENTS

| | | | |
|---|---|---|---|
| 4,306,787 | 12/1981 | Fukuhara et al. | 354/432 |
| 4,346,970 | 8/1982 | Kawabata et al. | 354/407 |
| 4,613,748 | 9/1986 | Imai | 250/201 PF |
| 4,687,917 | 8/1987 | Kusaka et al. | 354/408 X |
| 4,768,052 | 8/1988 | Hamada et al. | 354/402 |
| 4,774,540 | 9/1988 | Taniguchi et al. | 354/402 |

FOREIGN PATENT DOCUMENTS 118019 9/1980 Japan .................. 354/407

Primary Examiner—W. B. Perkey
Attorney, Agent, or Firm—Burns, Doane, Swecker & Mathis

[57] ABSTRACT

A focus condition detecting device which eliminates a wasteful operation thereof to obtain optical results of detection in a shortest period of time and wherein it can be discriminated correctly depending upon data read from a lens regarding an exit pupil of the lens whether or not detection of a focus condition is possible. The device comprises an optical means which forms a plurality of pairs of light images from beams of light from pairs of areas of an exit pupil plane of an interchangeable lens. Relative displacements between the light images are detected by a plurality of focus condition detecting means. Data regarding optical characteristics of the lens are read from the lens, and in accordance with the data thus read, those ones of the focus condition detecting means for which detection of a focus condition is possible are selected from an optical relationship between the optical means and the exit pupil of the lens. An in-focus condition is finally determined from focus condition signals produced from the selected focus condition detecting means.

6 Claims, 20 Drawing Sheets

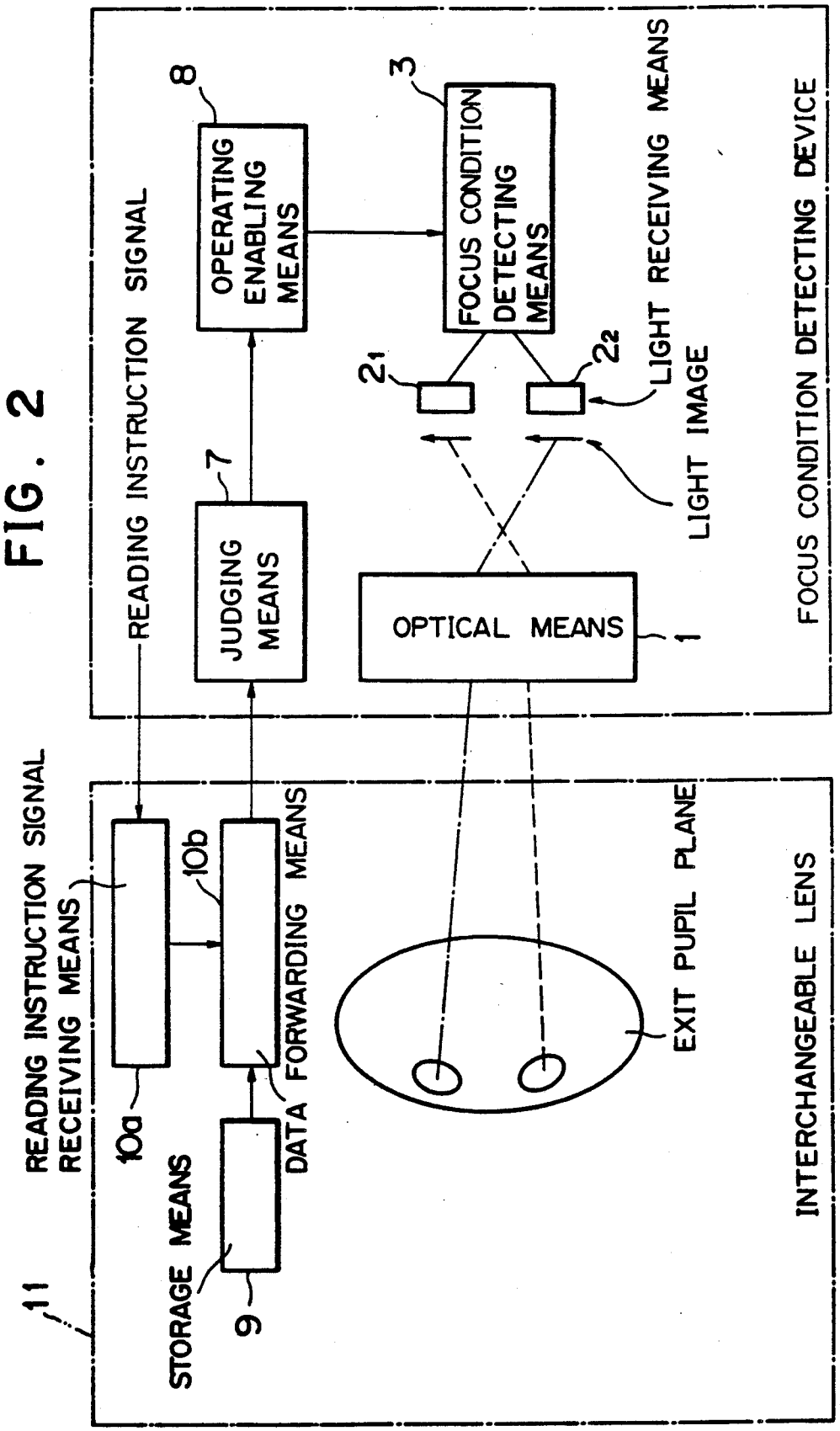

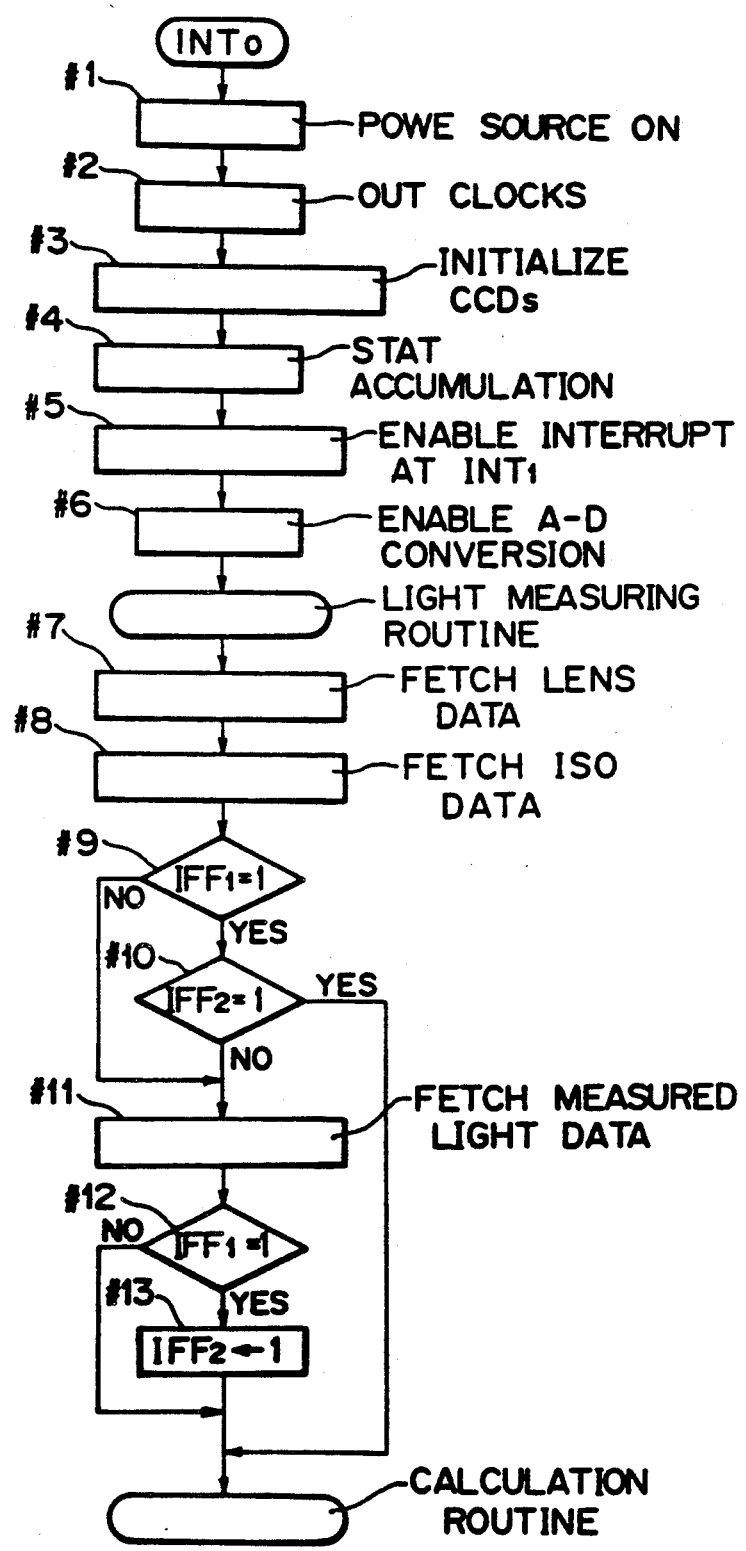

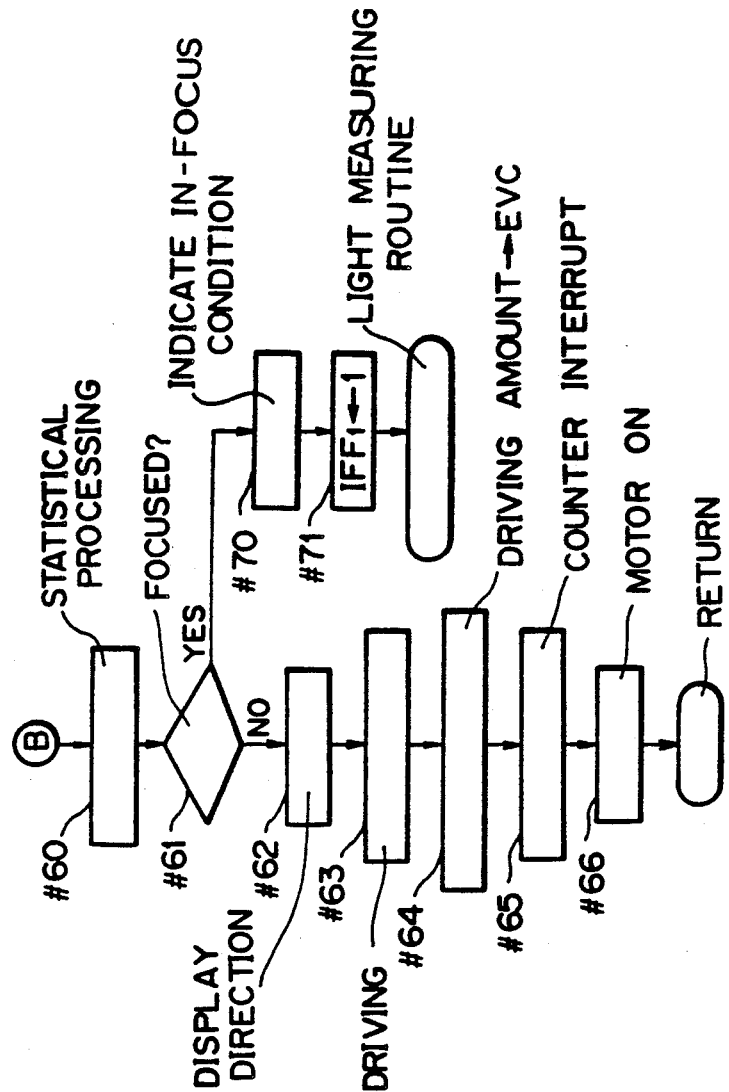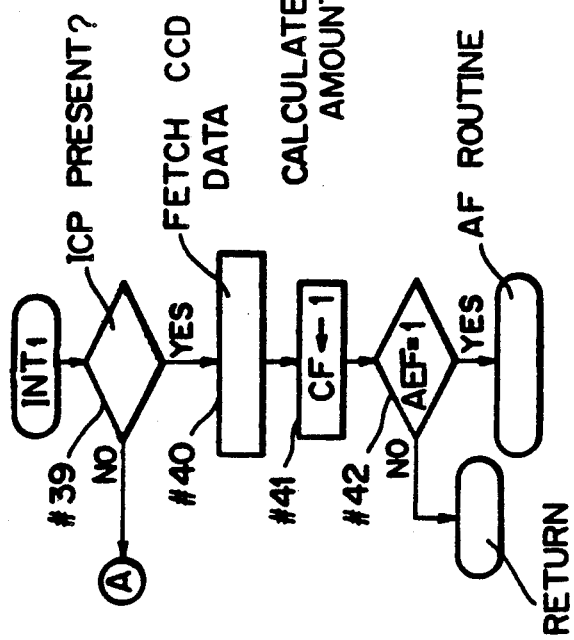

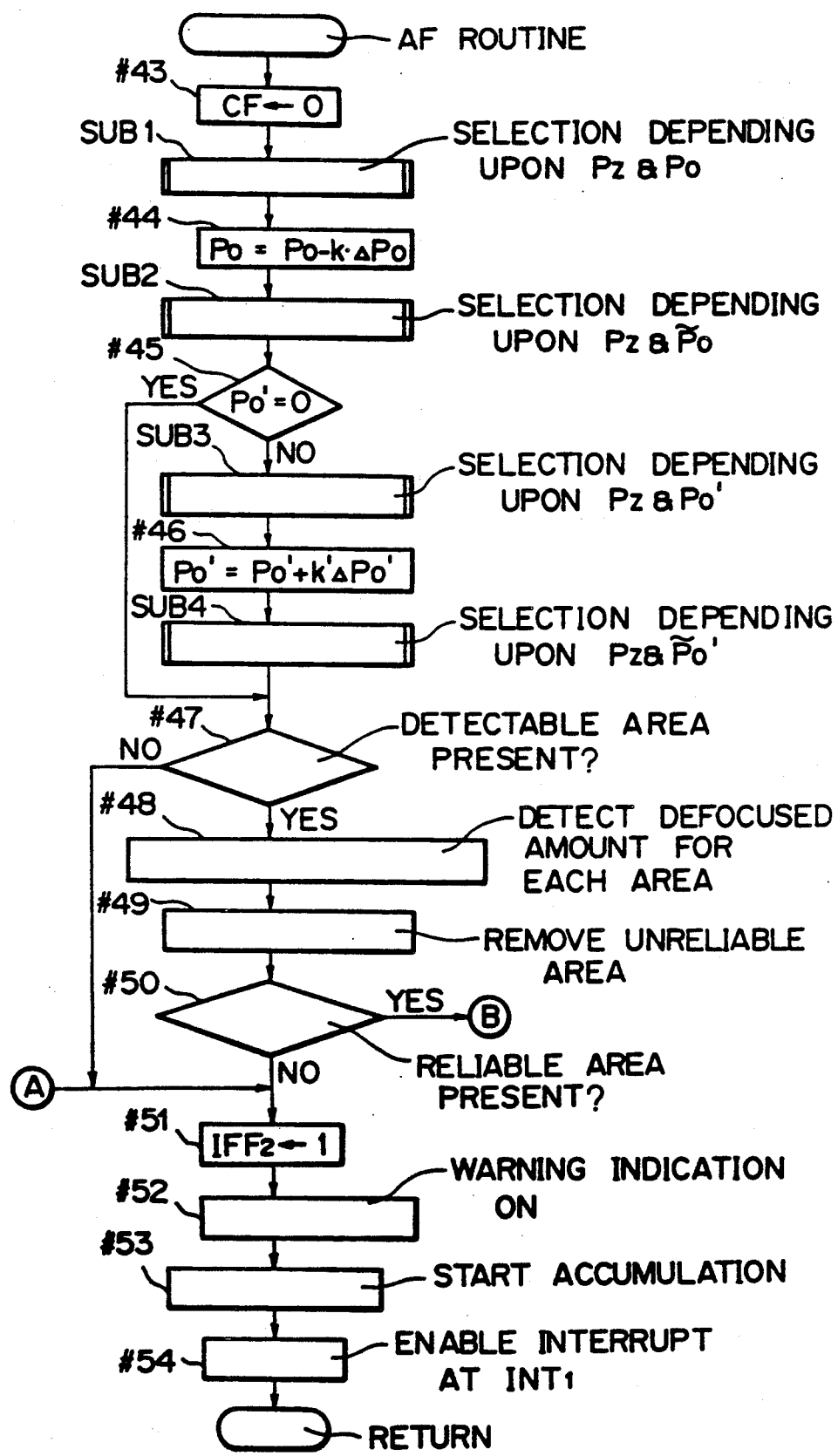

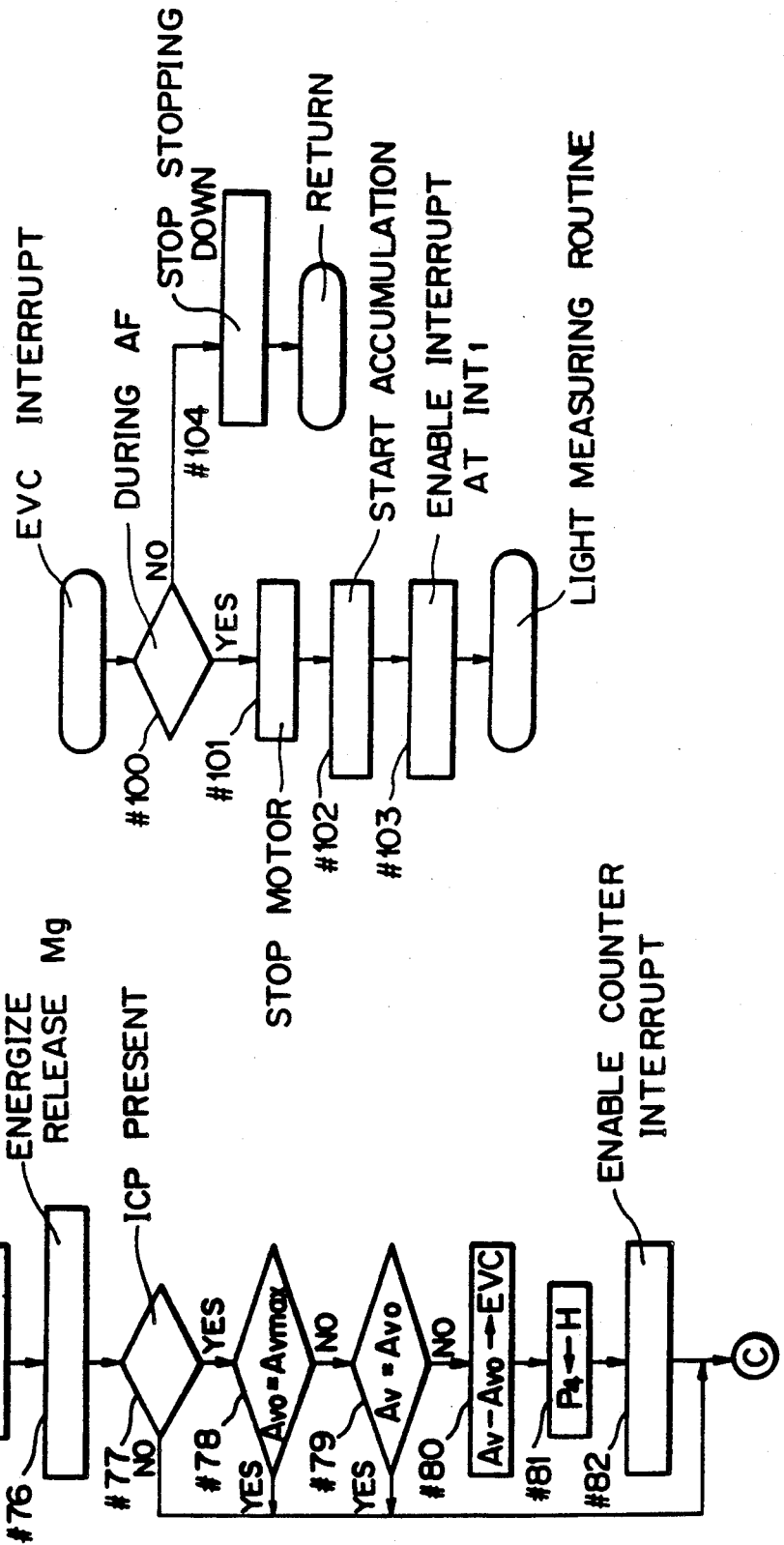

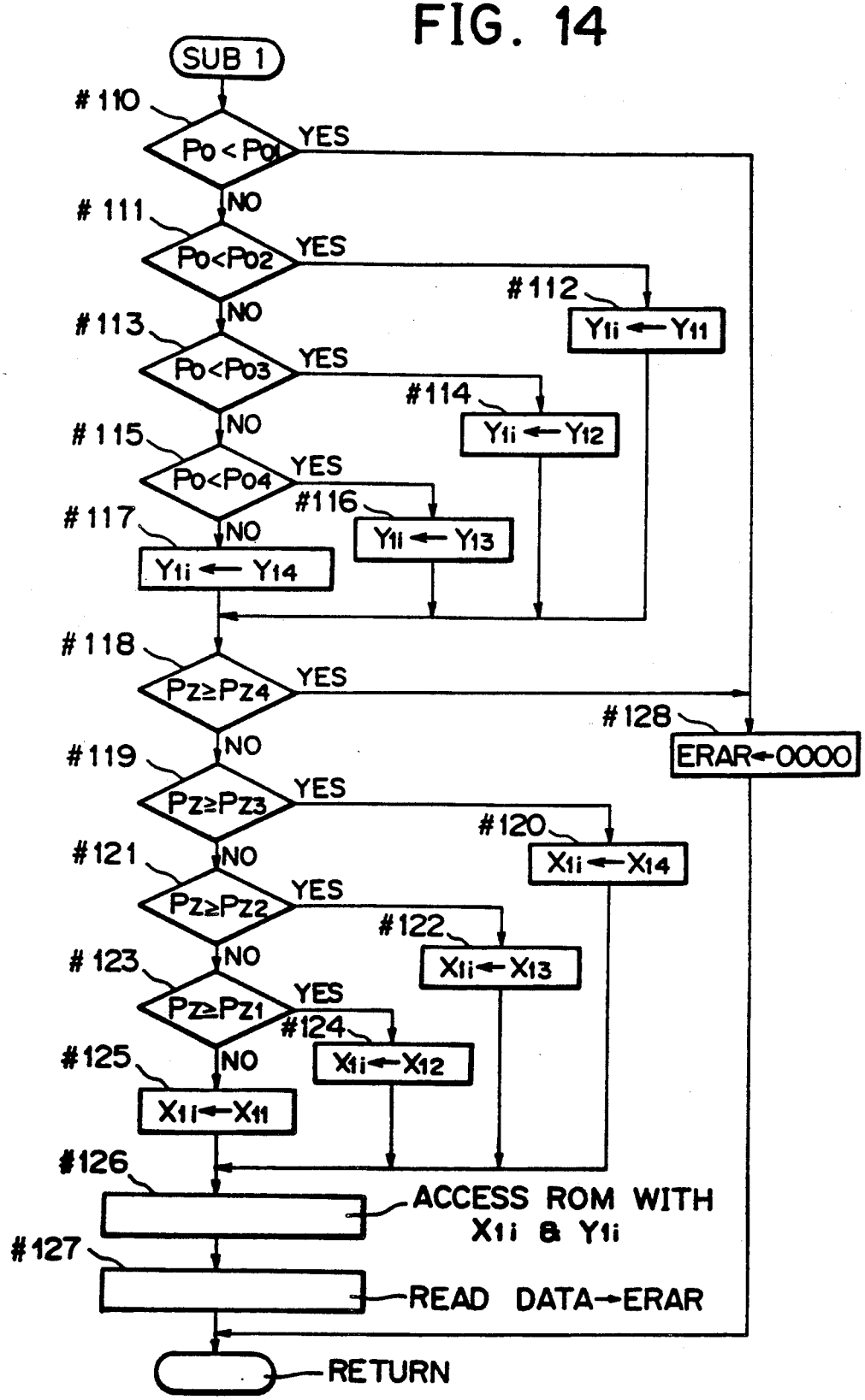

FOCUS CONDITION DETECTING DEVICE

This application is a continuation of application Ser. No. 07/448,648 now abandoned, filed Dec. 11, 1989 which is a continuation of application Ser. No. 07/193,794, now U.S. Pat. No. 4,903,065 filed May 13, 1988.

BACKGROUND OF THE INVENTION

1. Field of the Invention

This invention relates to a focus condition detecting device of the type which employs a TTL (through the lens) phase difference detecting method, and more particularly to a focus condition detecting device of the type mentioned which has a plurality of focus condition detecting areas. The focus condition detecting device of the present invention is particularly suitable for an automatic focus condition detecting device for a single lens reflex camera on which one of various interchangeable lenses may be selectively mounted when the camera is to be used.

2. Description of the Prior Art

A focus condition detecting device of the TTL phase difference detecting type is widely employed in automatic focusing systems of single lens reflex cameras. In a focus condition detecting device of the type mentioned, a focus condition is determined in accordance with a difference between first and second images of light formed from light from an object which has passed first and second portions of a plane of an exit pupil of an interchangeable lens. In the focus condition detecting device, the position and size of an AF (automatic focusing) pupil which is to be passed by an AF beam of light to be used for detection of a focus condition depend upon designing of a camera body. Where the AF pupil is within an exit pupil of an interchangeable lens, no eclipse will appear in an AF beam of light and no trouble will occur in a focus condition detecting operation. However, the positions or sizes of exit pupils of interchangeable lenses are not constant, and in some cases, an AF pupil may be displaced from an exit pupil so that an eclipse may appear in an AF beam of light. In such an instance, there is a problem that an error appears in detection of a focus condition or in some cases, detection of a focus condition is impossible.

thus, it has been proposed to prepare a plurality of different types of pairs of focus condition detecting optical sensors and selectively use one of the pairs of focus condition detecting optical sensors in accordance with a fully open aperture value of a lens used (Japanese Patent Publication No. 62-6206). However, since the prior art arrangement does not involve accurate comparison in dimensional relationship or positional relationship between an exit pupil of an interchangeable lens and an AF pupil of a camera body, presence or absence of an eclipse in an AF beam of light cannot be discriminated with accuracy. Besides, it is not at all taken into consideration that an exit pupil may be limited also on the inside thereof as in a catadioptric lens nor that the shape of an exit pupil as viewed out of an optical axis may be deformed.

Meanwhile, as interchangeable lenses for single lens reflex cameras having AE (automatic exposure) and AF functions of the TTL type, a large number of lenses have been developed wherein data for automatic exposure such as a fully open aperture value, a maximum aperture value and a focal length and data for automatic focusing such as a lens feeding amount converting coefficient are stored fixedly such that they may be accessed from a camera body. However, no lens has been proposed wherein data of a exit pupil is fixedly stored together with a fully open aperture value. This is because such data of an exit pupil can be found in most cases from data of a fully open aperture value.

In such a focus condition detecting device of the TTL phase difference detecting type as described above, if, for example, a plurality of focus condition detecting frames or distance measuring frames including both on-axis and out-of-axis distance measuring frames are provided and each includes a plurality of distance measuring areas for actually detecting a focus condition therethrough, then the focus condition detecting device will have a very large number of distance measuring areas. In some of such distance measuring areas, optically correct detection of a focus condition may not be attained due to the position of size of the exit pupil of the interchangeable lens or the shape of the exit pupil as viewed from an out-of-axis position. Where such an interchangeable lens is mounted on the camera, it would be waste of time and require an excessively long time for detection of a focus condition if detection of a focus condition is attempted for each of all of the distance measuring areas of each of all of the distance measuring frames of the interchangeable lens.

Further, in the focus condition detecting device disclosed in Japanese Patent Publication No. 62-6206 mentioned above, whether detection of a focus condition is possible or impossible is discriminated depending upon a fully open aperture value of an interchangeable lens. As camera systems have been developed progressively, however, whether detection of a focus condition is possible or impossible may not sometimes be discriminated correctly only from a fully open aperture value of an interchangeable lens. For example, when a composition of photographing is to be decided, it will be convenient if there is a distance measuring area outside an optical axis. In this instance, however, the focus condition detecting optical system will view an exit pupil of the interchangeable lens in an oblique direction comparing with a case wherein detection of a focus condition is conducted in a distance measuring area on an optical axis. Accordingly, it is a problem that the shape of the exit pupil is deformed and consequently it cannot be discriminated correctly from data of a fully open aperture value whether detection of a focus condition is possible or impossible.

SUMMARY OF THE INVENTION

It is an object of the present invention to provide a focus condition detecting device which eliminates a wasteful operation thereof to obtain optical results of detection in a shortest period of time.

It is another object of the present invention to provide a focus condition detecting device wherein it can be discriminated correctly depending upon data read from a lens regarding an exit pupil of the lens whether or not detection of a focus condition is possible.

In order to attain the objects, according to one aspect of the present invention, there is provided a focus condition detecting device which comprises an optical means for forming a plurality of pairs of images of light from beams of light from a plurality of pairs of areas of an objective lens, a plurality of pairs of light receiving means for receiving thereon the pairs of light images from the optical means, a plurality of focus condition detecting means for detecting a relative displacement between the images of light in pairs received by the pairs of light receiving means to deliver focus condition signals of the objective lens for the mutually different areas, means for providing data regarding optical characteristics of the objective lens, a selecting means for selecting those of the focus condition detecting means on which detection of a focus condition is possible depending upon the data of the optical characteristics, and a determining means for determining a focus condition of the objective lens in response to a plurality of focus condition signals from the selected ones of the focus condition detecting means.

According to another aspect of the present invention, there is provided a focus condition detecting device which comprises an optical means for dividing a beam of light from an object in an area out of an optical axis of an objective lens into a pair of beams of light to pass different areas of an exit pupil of the objective lens and for forming a pair of images of light from the divided beams of light, a pair of light receiving means for receiving the pair of images of light thereon, a focus condition detecting means for detecting a relative displacement between the pair of images of light depending upon outputs of the light receiving means to detect a focus condition of the objective lens, and a judging means for judging it depending upon data regarding the exit pupil of the objective lens whether or not it is possible for the focus condition detecting means to effect optically accurate detection of a focus condition from a combination of the optical means and the objective lens.

According to a further aspect of the present invention, there is provided an interchangeable lens which comprises means for receiving a reading signal from a body of a camera on which the interchangeable lens is mounted, and means responsive to the reading signal for successively forwarding data peculiar to the interchangeable lens, the data to be forwarded including data regarding a diameter and a position of an exit pupil of the interchangeable lens and correction of a height of an image.

The above and other objects, features and advantages of the present invention will become apparent from the following description and the appended claims, taken in conjunction with the accompanying drawings.

BRIEF DESCRIPTION OF THE DRAWINGS

FIG. 2 is a similar view but illustrating general construction of a focus condition detecting device according to another aspect of the present invention;

FIGS. 11a–11c, 12a–12c, 13a–13c and 14–17 are flow charts illustrating operation of the camera system of FIG. 10.

DETAILED DESCRIPTION OF THE PREFERRED EMBODIMENT

Figure 1:
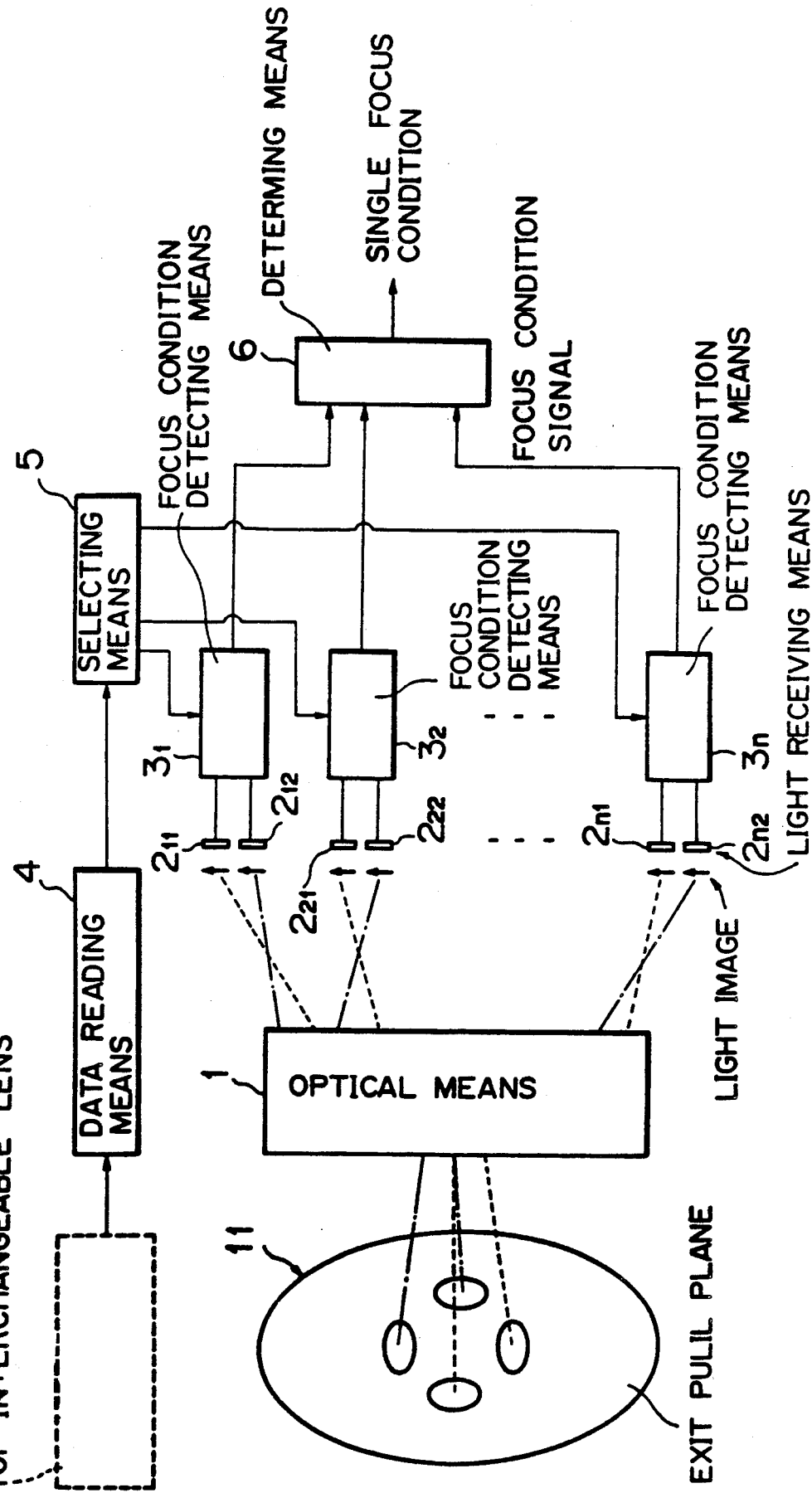
FIG. 1 is a diagrammatic representation illustrating general construction of a focus condition detecting device according to one aspect of the present invention.

Referring first to FIG. 1, there is shown general construction of a focus condition detecting device according to one aspect of the present invention. The focus condition device comprises an optical means 1 for forming a plurality of pairs of images of light from beams of light from a plurality of pairs of areas of a plane of an exit pupil of an objective lens 11 in the form of an interchangeable lens, a plurality of pairs of light receiving means $2_{11}$, $2_{12}$; $2_{21}$; ..., and $2_{n1}'2_{n2}$ for receiving thereon the pairs of light images from the optical means 1, a plurality of focus condition detecting means $3_1, 3_2, \ldots$, and $3_n$ for detecting a relative displacement between the images of light in pairs received by the pairs of light receiving means $2_{11}$, $2_{12}$; $2_{21}$; $2_{22}$; ..., and $2_{n1}$, $2_{n2}$ to deliver focus condition signals of the photographing lens 11 for the mutually different areas, a data providing or reading means 4 for reading data regarding optical characteristics of the interchangeable lens 11 such as an exit pupil from the interchangeable lens 11, a selecting means 5 for selecting those of the plurality of focus condition detecting means $3_1, 3_2, \ldots$, and $3_n$ on which detection of a focus condition is possible depending upon the data of the optical characteristics of the interchangeable lens 11, and a determining means 6 for determining a focus condition of the interchangeable lens 11 in response to a plurality of focus condition signals from the selected ones of the focus condition detecting means.

It is to be noted that FIG. 1 illustratively shows, in a functional block diagram, general construction of a focus condition detecting device of the present invention, and in a preferred embodiment of the present invention which will be hereinafter described, part of the focus condition detecting means $3_1, 3_2, \ldots$, and $3_n$, selecting means 5 and determining means 6 are realized by a program of a microcomputer.

In operation, the optical means 1 forms a plurality of pairs of images of light from beams of light from the plurality of pairs of areas of the pupil plane of the interchangeable lens 11. The plurality of pairs of light images are received by the plurality of pairs of light receiving means $2_{11}$, $2_{12}$; $2_{21}$, $2_{22}$; ..., and $2_{n1}$, $2_{n2}$. The plurality of focus condition detecting means $3_1, 3_2, \ldots$, and $3_n$ detect relative displacements between the light images in pair received by the pairs of light receiving means and thus deliver focus condition signals of the photographing lens 11 for the mutually different areas.

In the focus condition detecting device, the optical relationship between the exit pupil of the interchangeable lens 11 and the optical means 1 may be such that it is difficult to form an image of light by the optical means, or otherwise the illuminance distribution of images of light received by the light receiving means $2_{11}$, $2_{12}$; $2_{21}$, $2_{22}$; . . ., and $2_{n1}$, $2_{n2}$ is not uniform. In such instances, focus conditions may not always be detected by all of the focus condition detecting means $3_1$, $3_2$, . . ., and $3_n$. Therefore, according to the present invention, data regarding the exit pupil of the interchangeable lens 11 are read from the interchangeable lens 11 by the reading means 4, and in accordance with the data thus read regarding the exit pupil, those ones of the plurality of focus condition detecting means $3_1$, $3_1$, . . ., and $3_n$ for which detection of a focus condition is possible are selected from an optical relationship between the optical means 1 and the exit pupil of the interchangeable lens 11 by the selecting means 5. Then, using a plurality of focus conditions signals thus obtained from the selected focus conditions detecting means $3_1$, $3_2$, . . ., and $3_n$, a focus condition is determined by the determining means 6. In this manner, a focus condition detecting operation is not at all performed for those of the focus condition detecting means for which it can be discriminated in advance from the optical relationship between the optical means 1 and the exit pupil of the interchangeable lens 11 without attempting a focus condition detecting operation that detection of a focus condition is impossible. Accordingly, there is no useless operation, and results of detection can be obtained in a short period of time.

Referring now to FIG. 2, there is shown general construction of a focus condition detecting device according to another aspect of the present invention. The focus condition detecting device comprises an optical means for dividing a beam of light from an object in an area out of an optical axis of an objective lens 11 in the form of an interchangeable lens into a pair of beams of light to pass different areas of a plane of an exit pupil of the interchangeable lens 11 and for forming a pair of images of light from the divided beams of light, a pair of light receiving means $2_1$ and $2_2$ for receiving the pair of image of light thereon, a focus condition detecting means 3 for detecting a relative displacement between the pair of beams of light depending upon outputs of the light receiving means $2_1$ and $2_2$ to detect a focus condition of the interchangeable lens 11, and a judging means 7 for judging depending upon data regarding the exit pupil of the interchangeable lens 11 whether or not it is possible for the focus condition detecting means 3 to effect optically accurate detection of a focus condition from a combination of the optical means 1 and the optical system of the interchangeable lens 11. The focus condition detecting device may further comprise an operation enabling means 8 for enabling operation of the focus condition detecting means 3 when detection of a focus condition is possible.

It is to be noted that also FIG. 2 illustratively shows, in a functional block diagram, general construction of a focus condition detecting device of the present invention, and in the preferred embodiment of the present invention, part of the focus condition detecting means 3, judging means 7 and operation enabling means 8 are realized by the program of the microcomputer.

Meanwhile, the interchangeable lens 11 includes a storage means 9 in which data peculiar to the lens 11 are fixedly stored, a reading instruction signal receiving means 10a for receiving a reading instruction signal from the body of the camera, and a data forwarding means 10b responsive to the reading instruction signal for successively forwarding the data stored in the storage means 9 to the body of the camera. The data stored in the storage means 9 includes data regarding a diameter of the exit pupil of the lens 11, a position of the exit pupil, and correction of a height of an image.

In operation, the optical means 1 of the focus condition detecting device shown in the right-hand side half of FIG. 2 divides a beam of light from an object in an area out of the optical axis of the interchangeable lens 11 into a pair of beams of light to pass different areas of the plane of the exit pupil of the interchangeable lens 11 and then forms a pair of images of light from the pair of divided beams of light. The light receiving means $2_1$ and $2_2$ receive the pair of image of light. The focus condition detecting means 3 detects a relative displacement between the pair of images of light depending upon outputs of the light receiving means $2_1$ and $2_2$ to detect a focus condition of the interchangeable lens 11. The judging means 7 judges, depending upon data from the interchangeable lens 11 regarding the exit pupil of the interchangeable lens 11, whether or not it is possible to effect optically accurate detection of a focus condition from a combination of the optical means 1 and the optical system of the interchangeable lens 11. The operation enabling means 7 enables operation of the focus condition detecting means 3 if the judging means 7 judges that it is possible to optically detect a focus condition with accuracy. Accordingly, with the focus condition detecting device, as data regarding the exit pupil of the interchangeable lens 11 is read from the interchangeable lens 11, judgment whether optically accurate detection of a focus condition is possible or not can be made more accurately comparing with another judgment wherein only data of a fully open aperture value is employed.

In the interchangeable lens 11 shown in the left-hand side half of FIG. 2, data peculiar to the lens 11 are fixedly stored in the storage means 9. When a reading instruction signal from the camera body is received by the reading instruction signal receiving means 10a, the data forwarding means 10b successively forwards the data stored in the storage means 9 in response to the reading instruction signal. Since the data stored in the storage means 9 include data regarding the diameter of the exit pupil of the lens, the position of the exit pupil and correction of the height of an image, even if the interchangeable lens 11 is used in combination with a body having a light measuring area out of an optical axis, the shape of the exit pupil can be corrected on the body side depending upon the data forwarded from the data forwarding means 10b of the interchangeable lens 11. Accordingly, the data regarding the exit pupil can be transmitted correctly to the camera body.

Figure 3:
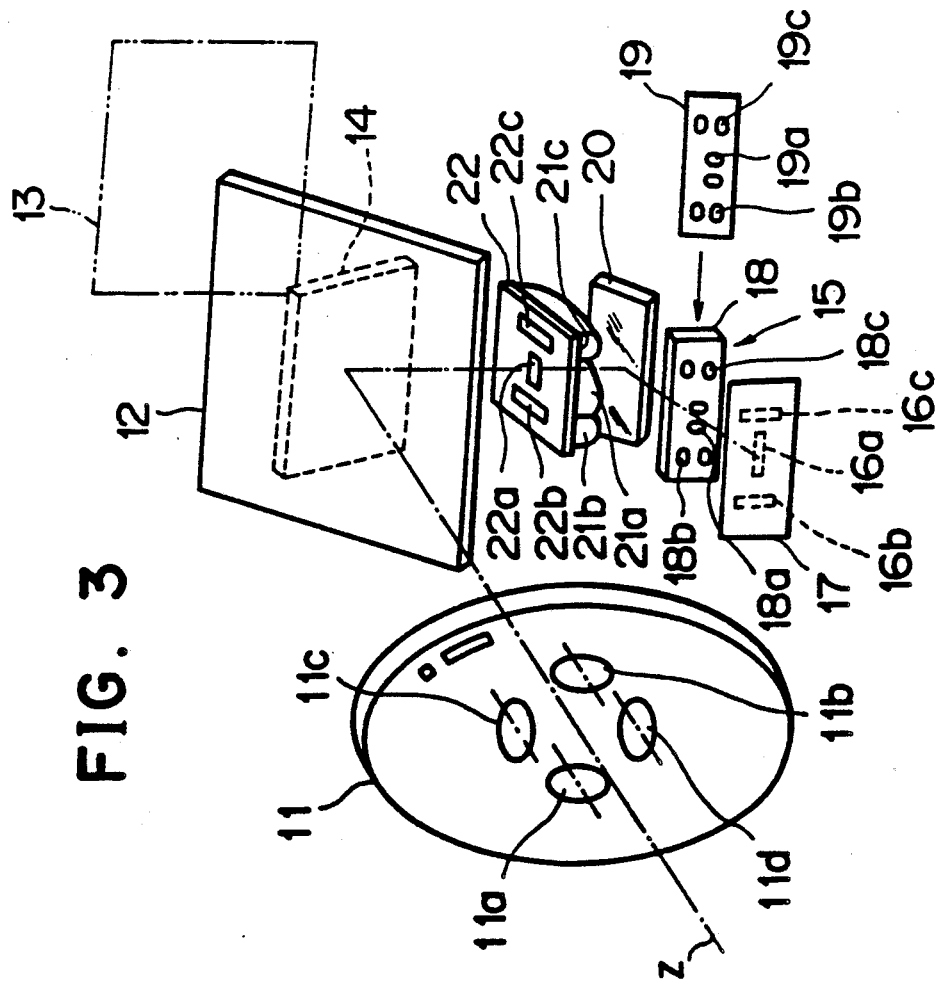
FIG. 3 is a perspective view of a focus condition detecting device showing a preferred embodiment of the present invention.

Referring now to FIG. 3, there is shown general construction of a multi-point distance measuring module provided in a single lens reflex camera. The module shown includes a photographing lens 11, a main mirror 12, a sub mirror 14 and a focus conditioning detecting optical system 15. A film is placed in a plane 13 behind the sub mirror 14. The focus condition detecting optical system 15 includes a field diaphragm 22 disposed near a focal plane of the photographing lens 11 and having three rectangular openings 22a, 22b and 22c formed therein. The focus condition detecting optical system 15 further includes three condenser lenses 21a, 21b and 21c, a module mirror 20, three separator lens pairs 18a, 18b and 18c, and three CCD (charge coupled device) image pickup element arrays 16a, 16b and 16c disposed on a focal plane 17 of the separator lenses 18a, 18b and 18c. The focus condition detecting optical system 15 further includes a diaphragm mask 19 having three pairs of circular or elliptical openings 19a, 19b and 19c formed therein. An image, the field of which has been limited by the rectangular opening 22a of the field diaphragm 22, then passes the condenser lends 21a and is then projected as two images on the CCD image pickup element array 16a by the diaphragm mask 19a and the separate lens pair 18a. Here, it is judged that when the distance between the two images is equal to a predetermined distance, the photographing lens 11 is in an in-focus condition, but when the distance is smaller or greater than the predetermined distance, the photographing lens 11 is in the forwardly or rearwardly out-of-focus condition, respectively. Images limited by the field diaphragms 22b and 22c are similarly projected to the CCD image pickup element arrays 16b and 16c by the condenser lenses 21b and 21c and the separator lens pairs 18b and 18c, respectively.

Figure 4:
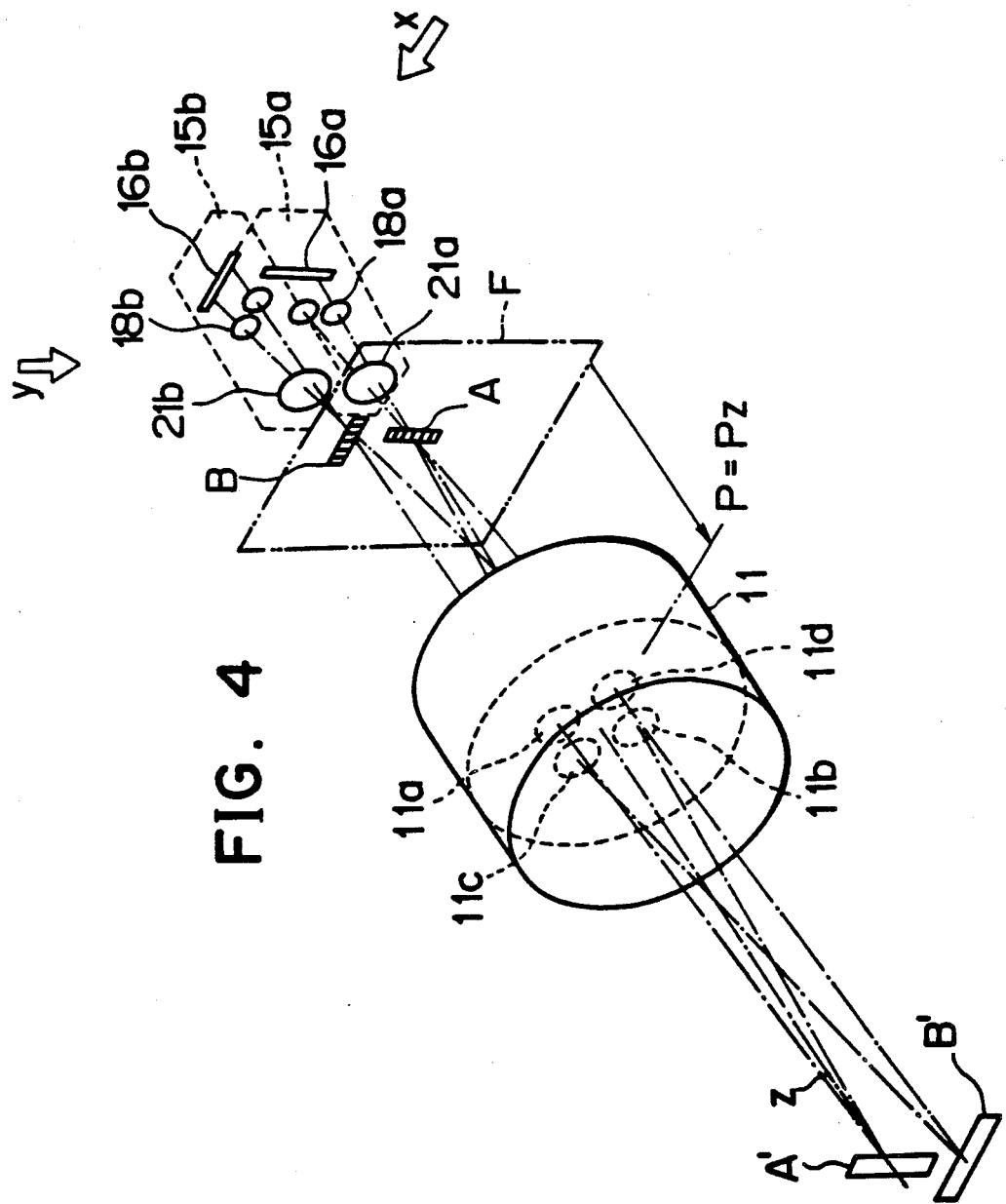
FIG. 4 is a perspective view showing detailed construction of essential part of the focus condition detecting device of FIG. 3.

Referring now to FIG. 4, the focus condition detecting optical system 15a on an optical axis z (i.e., a combination of the condenser lens 21a, separator lens pair 18a and CCD image pickup element array 16a) and the focus condition detecting optical system 15b out of the optical axis z (a combination of the condenser lens 21b, separator lens pair 18b and CCD image pickup element array 16b) are extracted from FIG. 3. Focal point detecting frames of the focus condition detecting optical systems 15a and 15b are shown as distance measuring frames A and B on a film equivalent plane F. The distance measuring frames A and B will be hereinafter referred to as on-axis distance measuring frame and out-of-axis distance measuring frame, respectively. Meanwhile, distance measuring frames of the distance measuring frames A and B projected on a plane of an object article via the photographing lens 11 are denoted at A' and B', respectively. A pair images of the separator lens pair 18a of the on-axis focus condition detecting optical system 15a projected by the condenser lens 21a on the plane of the exit pupil of the photographing lens 11 are denoted at 11a and 11b. Another pair images of the separator lens pair 18b of the out-of-axis focus condition detecting optical system 15b projected by the condenser lens 21b on the plane of the exit pupil of the photographing lens 11 are denoted at 11c and 11d.

Figure 5:
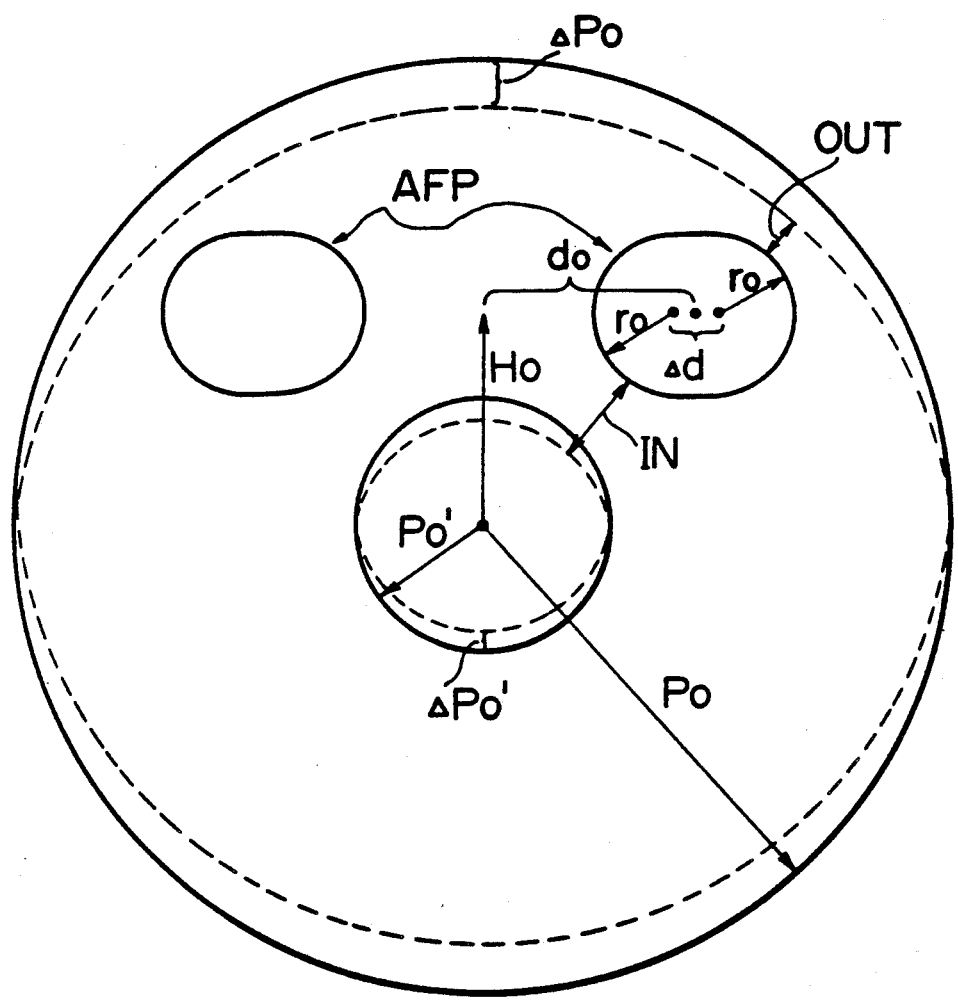
FIG. 5 is a diagrammatic representation illustrating a plane of an exit pupil of a photographing lens which is used with the focus condition detecting device of FIG. 3.
Figure 6:
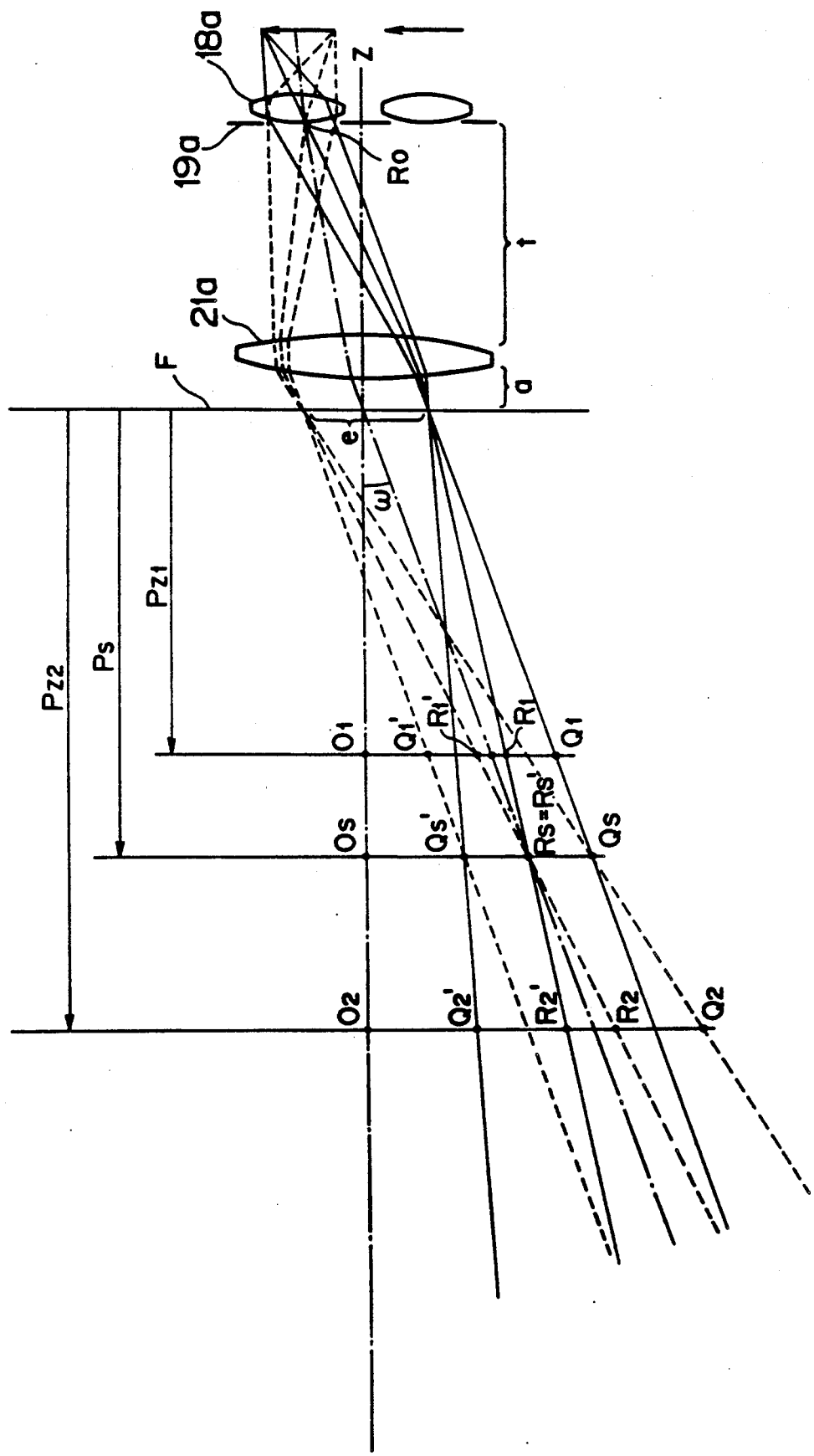
FIG. 6 is diagram illustrating several constants associated with a pupil of the focus condition detecting device of FIG. 3.
Figure 7:
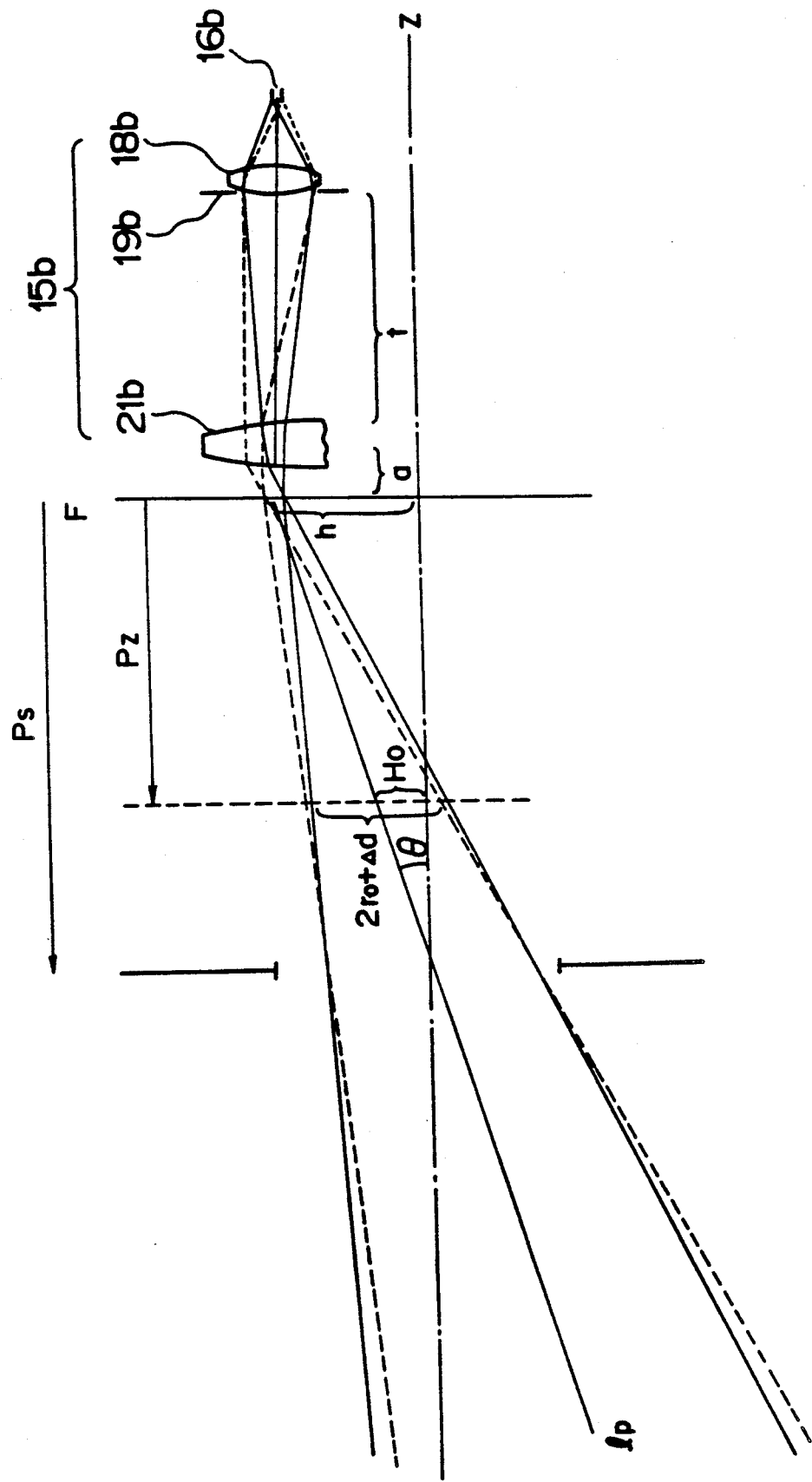
FIG. 7 is a diagram illustrating an out-of-axis focus condition detecting optical system for use with the focus condition detecting device of FIG. 3.

FIG. 5 generally illustrates positional relationships between an exit pupil opening of the photographing lens at a given position of the exit pupil of the photographing lens and areas of the exit pupil passed by AF beams of light which enters the focus condition detecting optical systems. FIGS. 6 and 7 are diagrammatic representations illustrating, among parameters appearing in FIG. 5, constants relating to the AF pupil which are determined by designing and arrangement of the focus condition detecting optical systems. In FIG. 6, the on-axis focus condition detecting optical system 15a is viewed in the direction indicated by an arrow mark x in FIG. 4, but if the out-of-axis focus condition detecting optical system 15b is viewed in the direction indicated by another arrow mark y in FIG. 4, then a similar view will be provided. FIG. 7 is a view wherein the out-of-axis focus condition detecting optical system 15b is viewed in the direction of the arrow mark x in FIG. 4.

Before entering the following description, various parameters and constants appearing in FIGS. 5 to 7 will be described.

Referring to FIG. 5, reference symbol Pz denotes an exit pupil position which is defined as a distance between the film equivalent plane F and a plane of an exit pupil of a predetermined photographing lens.

Po is a radius of an outside exit pupil at the exit pupil position Pz. The radius Po will be hereinafter referred to as exit pupil outer radius.

$\Delta$Po is a parameter with which the shape of the outside exit pupil as viewed from a predetermined image height position is to be corrected. The parameter $\Delta$Po will be hereinafter referred to as outside exit pupil image height correcting data or outside image height correcting data for short.

Po' is an exit radius for restricting an inside exit pupil where the photographing lens used is of the cata-dioptric type. The exit pupil radius will be hereinafter referred to as exit pupil inner radius. Although generally the exit pupil outer radius Po and the exit pupil inner radius Po' are not always involved in the same exit pupil position, it is assumed in the following description that they are involved in the same position.

$\Delta$Po' is a parameter with which the shape of the inside exit pupil as viewed from a predetermined image height position is to be corrected. The parameter $\Delta$Po' will be hereinafter referred to as inside exit pupil image height correcting data or inside image height correcting data for short. Although generally the shape of an exit pupil is circular in most cases, it approaches an ellipse such as shown in a broken line in FIG. 5 as the image height on the plane of the film increases. $\Delta$Po and $\Delta$Po' are parameters which represent a degree of such change in shape or deformation of the exit pupil.

AFP is an area through which an AF beam of light to enter the focus condition detecting optical system passes.

Ho is an amount of displacement of an AF beam area AFP from the main optical axis z of the photographing lens. In the case of the on-axis focus condition detecting optical system 15a, the amount of displacement Ho is set to Ho=0.

ro is a magnitude of an AF beam area AFP at the exit pupil position Pz.

do is a distance between two AF beam areas AFP at the exit pupil position Pz. The distance do is an amount which has an influence on the detecting sensitivity of the focus condition detecting optical system, and if the distance do increases, the focus condition detecting sensitivity also increased, but this disables use of a photographing lens having a smaller exit pupil radius.

$\Delta$d is an out-of-focus amount of an AF beam area AFP in the focus condition detecting optical system.

OUT is an outside pupil margin amount which is provided by a beam of light incident to the focus condition detecting optical system relative to the photographing lens. The outside pupil margin amount OUT is represented by a following equation:

$$OUT = Po - ro - \{(Ho + \Delta Po)^2 + (do + \Delta d/2)^2\}^{\frac{1}{2}}$$

Particularly in the case of the on-axis focus condition detecting optical system 15a, normally Ho=0 and $\Delta$Po=0. Accordingly, $$OUT_z = Po - ro - do - \Delta d/2$$

IN is an inside pupil margin amount where the photographing lens used is of the cata-dioptric type and is represented by a following equation:

$$IN = \{(Ho + \Delta Po')^2 + (do - \Delta d/2)^2\}^{\frac{1}{2}} \cdot ro \cdot Po'$$

Particularly in the case of the on-axis focus condition detecting optical system 15a, Ho=0 and ΔPo=0. Accordingly, $$INz = do - \Delta d/2 \cdot ro \cdot Po'$$

Depending upon the positive or negative signs of the outside and inside pupil margin amounts OUT and IN, selection of distance measuring frames and selection of distance measuring areas in a distance measuring frame, which will be hereinafter described in detail, are effected.

Referring now to FIG. 6, reference symbol a denotes a distance from the condenser lens 21a to the film equivalent plane F.

t is a distance from the condenser lens 21a to the separator lens 18a or else to the diaphragm mask 19a very near to the separator lens 18a.

Ps is a position to which an image of the separator lens 18a or else the diaphragm mask 19a very near to the separator lens 18a is projected by the condenser lens 21a, and the image and the position will be hereinafter referred to as AF pupil and AF pupil position, respectively.

Os is a point on the optical axis at the AF pupil position Ps, and QsQs' is an AF pupil opening at the AF pupil position.

The AF pupil position Ps and the AF pupil opening QsQs' are uniquely determined specifically from the power of the condenser lens 21a and the aforementioned distances a and t. Accordingly, the distances QsQs' and QsQs from the point Os on the optical axis to the farthest and nearest points Qs and Qs', respectively, of the AF pupil opening QsQs' can be regarded as constants. Further, the magnitude e of a distance measuring frame on the film equivalent plane F and the inclination β of a main beam of light in the on-axis focus condition detecting optical system 15a with respect to the main optical axis z of the photographing lens are also determined specifically.

By the way, the out-of-focus amount Δd of an AF beam area AFP described hereinabove with reference to FIG. 5 is Δd>0 when the exit pupil position is farther or nearer than the conjugate position of the separator lens or the diaphragm mask determined in advance for the focus condition detecting optical system. This will described with reference to FIG. 6. Beams of light will be examined successively which pass the exit pupil of the photographing lens from the separator lens 18a past the condenser lens 21a. In the case of the exit pupil position Pz is Pz=Ps, beams of light indicated by a long and short dash chain line, a solid line and a broken line going from the central point Ro of the separator lens 18a pass a single point Rs=Rs', and the out-of-focus amount Δd is Δd=0. When the exit pupil position Pz of the photographing lens is smaller than the AF pupil position Ps (that is, Pz=Pz$_1$<Ps), the beam of light indicated by a solid line going from the central point Ro of the separator lens 18a passes a point R$_1$, and the beam of light indicated by a broken line passes another point R$_1$' while the beam of light indicated by a long and short dash chain line passes an intermediate point between the two points R$_1$ and R$_1$', and here the out-of-focus amount Δd is Δd>0. When the exit pupil position Pz of the photographing lens is positioned farther than the AF pupil position Ps (that is, Pz=Pz$_2$>Ps), the beam of light indicated by a solid line going from the central point Ro of the separator lens 18a passes a point R$_2$', and the beam of light indicated by a broken line passes another point R$_2$ while the beam of light indicated by a long and short dash chain line passes an intermediate point between the two points R$_2$' and R$_2$, and also the out-of-focus amount Δd is Δd>0 here. It is to be noted that while it is assumed here that the AF beam restricting mask (diaphragm mask) of the focus condition detecting optical system is circular in order to represent relationships of various parameters in a simple manner, generally it need not be circular.

Referring now to FIG. 7, θ is an inclination of a main beam of light lp with respect to the main optical axis z in the out-of-axis focus condition detecting optical system 15b, and h is an amount of displacement of an out-of-axis distance measuring frame from the main optical axis z. The parameters θ and h are also determined specifically by a geometrical arrangement of the CCD image pickup element array 16b, separator lens 18b (and diaphragm mask 19b very to the separator lens 18b) and the condenser lens 21b. Accordingly, once designing of the camera body is completed, then the parameters θ and h will thereafter remain unique constants.

The parameters Ho, ro and do described hereinabove with reference to FIG. 5 are represented as follows using the parameters mentioned above.

In particular, at first the amount Ho of displacement of an AF beam area AFP from the main optical axis z of the photographing lens is represented as $$Ho = h - (Pz + a)\tan\theta$$

Here, the amount h of displacement of the distance measuring frame from the main optical axis z, the distance a from the condenser lens 21a to the film equivalent plane F and the inclination θ of the main beam lp of light with respect to the main optical axis z are all information regarding the body of the camera and thus constants as described hereinabove. To the contrary, the exit pupil position Pz is information regarding a lens and may be different for each of lenses.

The magnitude ro of an AF beam area AFP at the exit pupil position Pz is represented as $$ro = |OQ - OQ'|/2$$

Here, O is a point on the optical axis at the exit pupil position Pz, and Q ia a point of the AF beam area AFP fartherest from the optical axis at the exit pupil position Pz while Q' is a point of the AF beam area AFP nearest to the optical axis at the exit pupil position Pz.

When Pz=Pz$_1$≦Ps, referring to FIG. 6, $$OQ = O_1Q_1 = \left(OsQs - \frac{e}{2}\right)\frac{Pz_1}{Ps} + \frac{e}{2}$$

$$OQ' = O_1Q_1' = \left(OsQs' + \frac{e}{2}\right)\frac{Pz_1}{Ps} - \frac{e}{2}$$

$$\therefore RO = \frac{1}{2}\left|(OsQs - OsQs' - e)\frac{Pz_1}{Ps} + e\right|$$

To the contrary, when Pz=Pz$_2$>Ps, referring to FIG. 6, $$OQ = O_2Q_2 = \left(OsQs + \frac{e}{2}\right)\frac{Pz_2}{Ps} - \frac{e}{2}$$

$$OQ' = O_2Q_2' = \left(OsQs' - \frac{e}{2}\right)\frac{Pz_2}{Ps} + \frac{e}{2}$$

$$\therefore ro = \frac{1}{2}\left|(OsQs - OsQs' + e)\frac{Pz_2}{Ps} + e\right|$$

Further, the distance do between the two AF beam areas AFP is represented as $$do = (OQs + OQs')\frac{Pz}{2Ps}$$

In the equations above, QsQs, OsQs', Ps and e are all body constants and hence constant. To the contrary, $Pz = Pz_1$ and $Pz_2$ are values peculiar to individual lenses.

As apparent from the matters described above, the outside and inside pupil margin amounts OUT and IN are written by way of the body constants OsQs, OsQs', Ps and e and the lens information Pz, Po, Po', ΔPo and ΔPo'. If suitable threshold values are provided for the outside and inside pupil margin amounts OUT and IN, selection of distance measuring zones in on-axis and out-of-axis distance measuring frames or selection of a distance measuring frame where there are a plurality of distance measuring frames can be effected. For selection of a distance measuring zone or a distance measuring frame, there are two available methods including a method of calculating, in a camera body, the outside and inside pupil margin amounts OUT and IN using the equations specified as above and another method of preparing, in a camera body, a table for setting suitable threshold values for Pz, Po, Po', Po and Po' based on the results calculated in advance to select a distance measuring zone. In the following description, however, the latter method is adopted.

At first, an example of selection of a distance measuring area in a distance measuring frame on the optical axis will be described.

Figure 8:
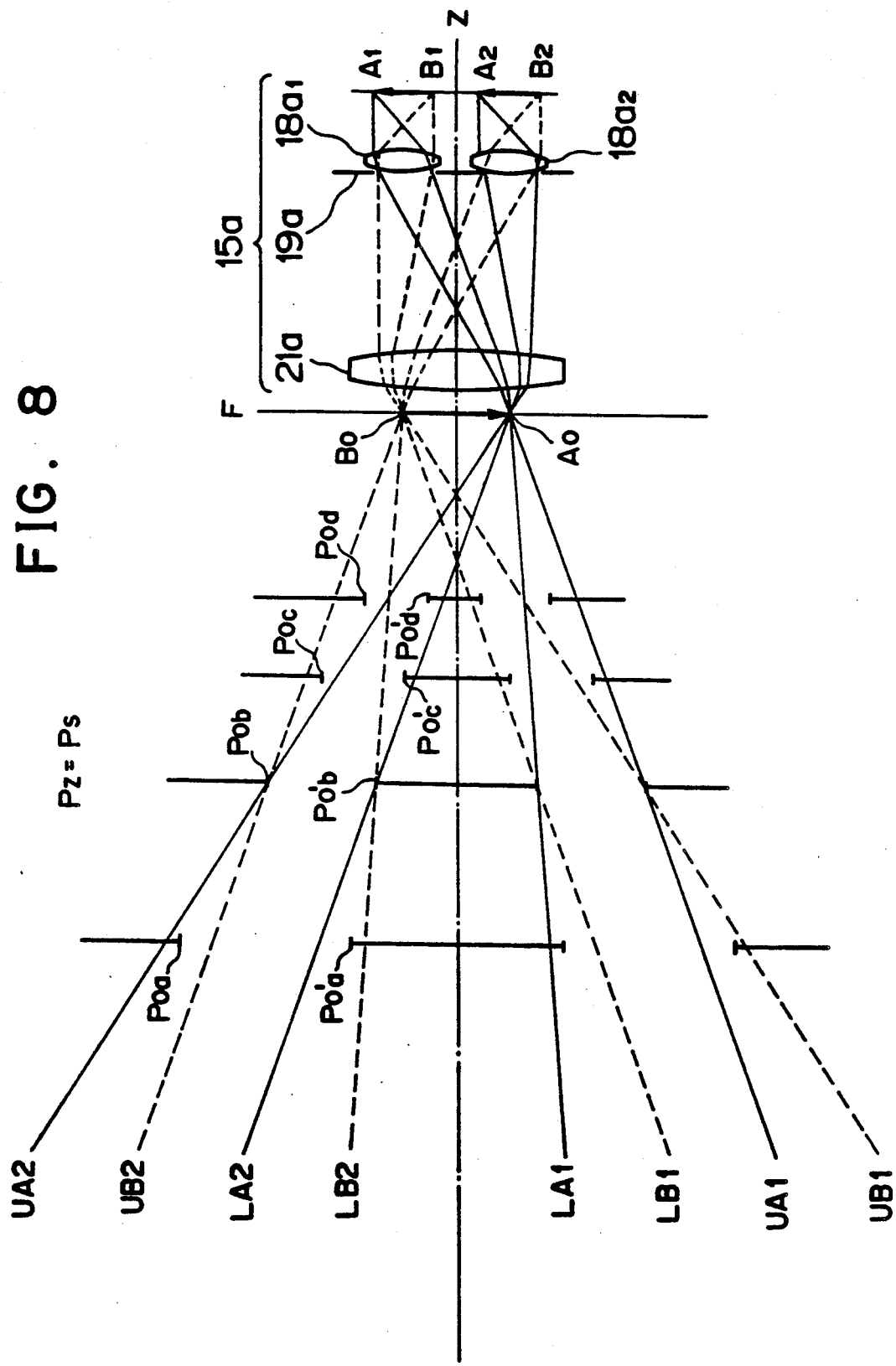
FIG. 8 is a diagram illustrating an on-axis focus condition detecting optical system for use with the focus condition detecting device of FIG. 3.

FIG. 8 illustrates various ecliptical conditions of AF beams of light in the on-axis focus condition detecting optical system 15a for various photographing lenses having exit pupils Poa, Poa'; Pob, Pob'; Poc, Poc'; and Pod, Pod'. Here, it is assumed that the exit pupils Pob and Pob' correspond to the AF pupil opening QsQs' in FIG. 6. An image AoBo on the film equivalent plane F is formed as images $A_1B_1$ and $A_2B_2$ on the CCD image pickup element arrays by the condenser lens 21a and the separator lenses $18a_1$ and $18a_2$, respectively. If passing areas of light incident to the points $A_1$, $B_1$, $A_2$ and $B_2$ on the CCD image pickup element arrays are examined, it can be found that light incident to the point $A_1$ passes a passing area LA1 to UA1; light incident to the point $B_1$ passes another passing area LB1 to UB1; light incident to the point $A_2$ passes a further passing area LA2 to UA2; and light incident to the point $B_2$ passes another passing area LB2 to UB2. In the case of the exit pupils Pob and Pob' which correspond to the AF pupil opening QsQs' of FIG. 6, naturally no eclipse will appear in an AF beam of light.

Figure 9:
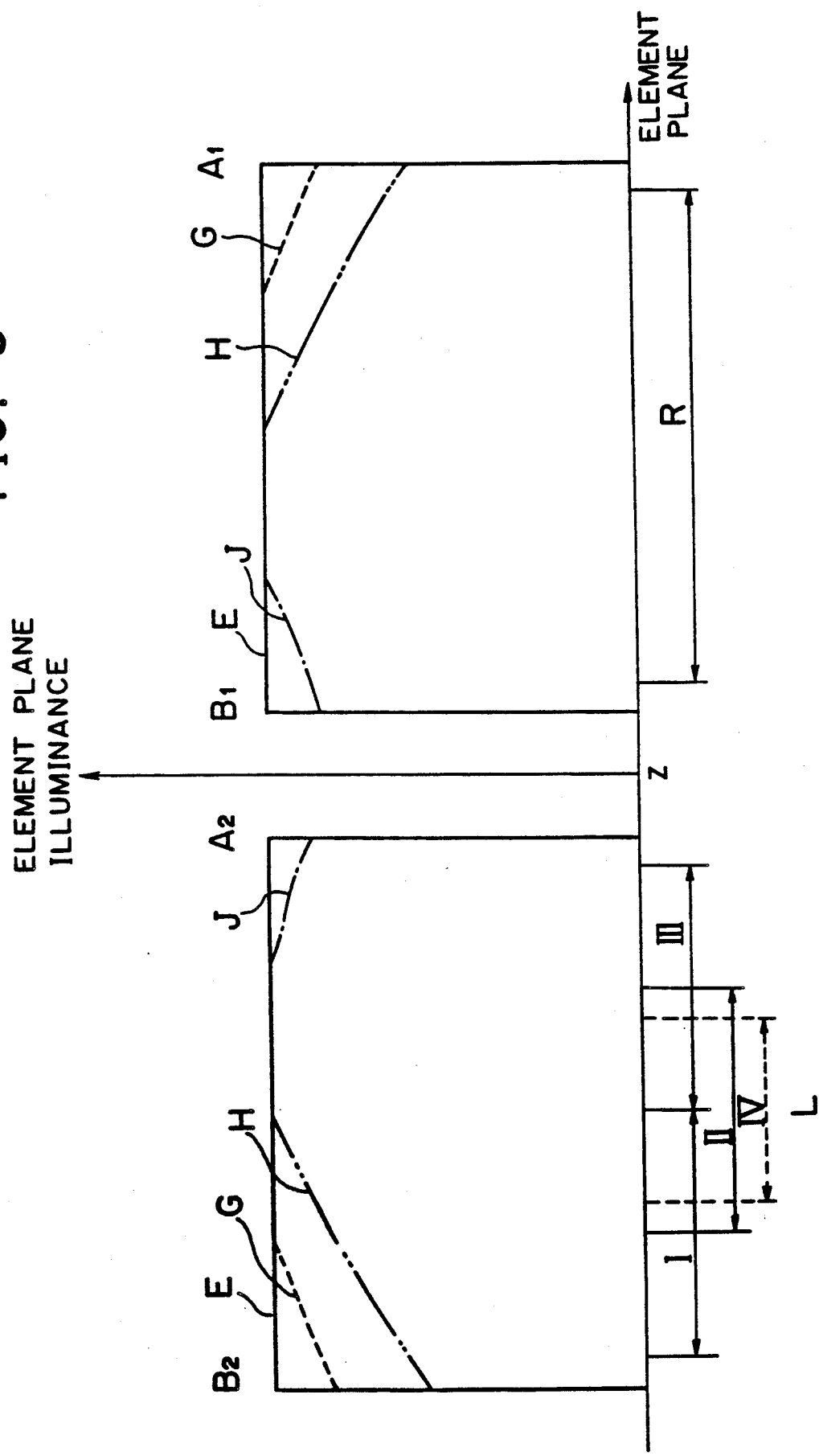
FIG. 9 is a diagram illustrating illuminance distributions on CCD image pickup element arrays for use with the focus condition detecting device of FIG. 3.

FIG. 9 illustrates illuminance distributions of a plane of the elements of the CCD image pickup element arrays corresponding to the exit pupils Poa, Poa'; Pob, Pob'; Poc, Poc'; and Pod, Pod'. Referring to FIG. 9, the axis of abscissa represents the direction in which the elements of each of the CCD image pickup element arrays is arranged while the axis of ordinate represents the illuminance on each of the planes of the elements. It is assumed that an image $A_1B_1$ is formed on the right-hand side image pickup element array R while an image $A_2B_2$ is formed on the left-hand side image pickup element array L. The left-hand side image pickup element array L is divided into four distance measuring areas I to IV.

Where a photographing lens having the exit pupils Pob and Pob' is used, no eclipse will be caused in an AF beam of light either by the outside Pob or the inside Pob' of the exit pupils Pob and Pob', and consequently, a uniform element plane illuminance distribution E is obtained. Accordingly, all of the distance measuring areas I to IV can be used.

Where a photographing lens having the exit pupils Poa and Poa' is used, eclipse will be caused in a beam of light at UA2 and a beam of light at UB1 by the outside exit pupil Poa. Consequently, the illuminance on the plane of the elements near the optical axis z is decreased such as shown by the distribution J. Further, since eclipse will be caused in a beam of light at LB2 and a beam of light at LA1 by the inside exit pupil Poa', the illuminance on the plane of the elements remote from the optical axis z is also decreased such as shown by the distribution G. Accordingly, the distance measuring area IV can be used without being influenced by eclipses of AF beams of light.

Where a photographing lens having the exit pupils Poc and Poc' is used, eclipses will be caused in a beam of light at UB2 and a beam of light at UA1 by the outside exit pupil Poc. Consequently, the illuminance on the plane of the elements remote from the optical axis z is decreased such as shown by the distribution G. Further, since eclipses will be caused in a beam of light at LA2 and a beam of light at LB1 by the inside exit pupil Poc', the illuminance on the plane of the elements near the optical axis z is also decreased such as shown by the distribution J. Accordingly, the distance measuring area IV can be used without being influenced by eclipses of AF beams of light.

Where a photographing lens having the exit pupils Pod and Pod' is used, great eclipses will be caused in a beam of light at UB2 and a beam of light at UA1 by the outside exit pupil Pod. Consequently, the illuminance on the plane of the elements remote from the optical axis z is decreased significantly such as shown by the distribution H. Accordingly, the distance measuring areas I, II and IV cannot be used. Further, since eclipses will be caused in a beam of light at LA2 and a beam of light at LB1 by the inside exit pupil Pod', the illuminance on the plane of the elements near the optical axis z is also decreased such as shown by the distribution J. Accordingly, the distance measuring area III cannot be used either. After all, no distance measuring area can be used in this instance.

Such tables as Table 1 to Table 4 below are produced from the facts described above.

TABLE 1

(Selection Table for On-Axis Distance Measuring Areas depending upon Exit Pupil Position and Exit Pupil Outer Radius)

| Po | Pz small ← | $Pz_1$ < | $Pz_2$ <Ps< | $Pz_3$ < | $Pz_4$ → large |
|---|---|---|---|---|---|
| small | x | x | x | x | x |
| $Po_1$ | IV(III) | IV(III) | I-IV | x | x |
| $Po_2$ (OsQs) | I-IV | I-IV | I-IV | x | x |
| $Po_3$ | I-IV | I-IV | I-IV | IV(I) | x |
| $Po_4$ | I-IV | I-IV | I-IV | I-IV | x |
| large | | | | | |

In the table above, Pz: exit pupil position
Ps: AF pupil position
Po: exit pupil outer radius
I-IV: distance measuring areas
x: distance measurement impossible

TABLE 2

(Selection Table for On-Axis Distance Measuring Areas depending upon Exit Pupil Position and Exit Pupil Inner Radius)

| Po' | Pz small ← | $Pz_1$ < | $Pz_2$ <Ps< | $Pz_3$ < | $Pz_4$ → large |
|---|---|---|---|---|---|
| ↑ small | x | I-IV | I-IV | I-IV | I-IV |
| $Po_1'$ | x | IV(I) | I-IV | I-IV | I-IV |
| $Po_2'$ (OsQs') | x | x | I-IV | I-IV | I-IV |
| $Po_3'$ | x | x | I-IV | IV(III) | I-IV |
| $Po_4'$ | x | x | x | x | x |
| ↓ large | | | | | |

In the table above, Pz: exit pupil position
Ps: AF pupil position
Po': exit pupil inner radius
I-IV: distance measuring areas
x: distance measurement impossible

TABLE 3

(Selection Table for Out-Of-Axis Distance Measuring Areas depending upon Exit Pupil Position and Deformed Exit Pupil Outer Radius)

| ~Po | Pz small ← | $Pz_1$ < | $Pz_2$ <Ps< | $Pz_3$ < | $Pz_4$ → large |
|---|---|---|---|---|---|
| ↑ small | x | x | x | x | x |
| ~$Po_1$ | x | x | I-IV | x | x |
| ~$Po_2$ (OsQs) | x | IV | I-IV | x | x |
| ~$Po_3$ | IV | I-IV | I-IV | x | x |
| ~$Po_4$ | I-IV | I-IV | I-IV | IV | x |
| ↓ large | | | | | |

In the table above, Pz: exit pupil position
Ps: AF pupil position
~Po: exit pupil outer radius
I-IV: distance measuring areas
x: distance measurement impossible

TABLE 4

(Selection Table for Out-Of-Axis Distance Measuring Areas depending upon Exit Pupil Position and Deformed Exit Pupil Inner Radius)

| ~Po' | Pz small ← | $Pz_1$ < | $Pz_2$ <Ps< | $Pz_3$ < | $Pz_4$ → large |
|---|---|---|---|---|---|
| ↑ small | I-IV | IV | I-IV | I-IV | I-IV |
| ~$Po_1'$ | x | x | I-IV | IV | x |
| ~$Po_2'$ (OsQs') | x | x | I-IV | x | x |
| ~$Po_3'$ | x | x | x | x | x |
| ~$Po_4'$ | x | x | x | x | x |
| ↓ large | | | | | |

In the table above, Pz: exit pupil position
Ps: AF pupil position
~Po': exit pupil inner radius
I-IV: distance measuring areas
x: distance measurement impossible Table 1 above indicates an example of selection table for distance measuring areas in an on-axis distance measuring frame from an exit pupil position Pz and an exit pupil outer radius Po. In Table 1, I, II, III and IV denote distance measuring areas. The mark x represents that measurement of the focus condition is impossible because the eclipse of the illuminance distribution is too great. $Po_1$ to $Po_4$ and $Pz_1$ to $Pz_4$ denote predetermined constants calculated from the equations appearing hereinabove. The exit pupil Pob described hereinabove corresponds to the conditions of Pz=Ps and Pob=OsQs; the exit pupil Poa corresponds to the conditions of $Pz_3$<Pz<$Pz_4$ and $Po_3$<Poa<$Po_4$; the exit pupil Poc corresponds to the conditions of $Pz_1$<Pz<$Pz_2$ and $Po_1$<Poc<$Po_2$; and the exit pupil Pod corresponds to the conditions of Pz<$Pz_1$ and Pod<$Po_1$. Selection of distance measuring areas in the case of a photographing lens of the non-cata-dioptric type can be attained using Table 1.

Meanwhile, Table 2 indicates an example of selection table for distance measuring areas in an on-axis distance measuring frame from an exit pupil position Pz and an exit pupil inner radius Po'. The exit pupil Pob' described hereinabove corresponds to the conditions of Pz=Ps and Pob'=OsQs'; the exit pupil Poa' corresponds to the conditions of $Pz_3$<Pz<$Pz_4$ and $Po_3'$<Poa'<$Po_4'$; the exit pupil Poc' corresponds to the conditions of $Pz_1$<Pz<$Pz_2$ and $Po_1'$<Poc'<$Po_2'$; and the exit pupil Pod' corresponds to the conditions of Pz<$Pz_1$ and Pod'<$Po_1'$. In the case of a photographing lens of the catadioptric type, at first selection of distance measuring areas is effected, at a predetermined exit pupil position Pz, from the exit pupil outer radius Po using Table 1 above, and then selection of distance areas is effected from the exit pupil inner radius Po' using Table 2, whereafter a distance measuring area common to the selected distance areas is finally determined.

Table 3 above indicates an example of selection table for distance measuring areas in an out-of-axis distance measuring frame from an exit pupil position Pz and a deformed exit pupil outer radius Po. The deformed exit pupil outer radius Po is determined approximately from the exit pupil outer radius Po as viewed from a position on or near the optical axis, the outside image height correcting data ΔPo and the body constant k relating to the exit pupil position Pz in accordance with a following expression:

$$Po = Po - k \cdot \Delta Po \quad (0 \leq k \leq 1)$$

Here, if it is assumed that in FIG. 7 the position at which the main beam lp of the AF beam of light intersects the optical axis z is substantially Pz=Ps (AF pupil position, a constant), k is k=0 near Pz=Ps, which represents that the AF beam of light is not displaced with respect to the main optical axis z, and at a position at which an eclipse most possibly appears, there is no influence of ΔPo (refer to FIG. 5). Further, when Pz<<Ps or Pz>>Ps, k approaches 1.

Since generally an AF beam area AFP of an out-of-axis distance measuring area is displaced from the optical axis z, k is a parameter which varies from k=0 to 0.8 or so. The signification of the value k itself is a coefficient with which weighting of ΔPo is to be changed when the marginal degrees of the AF beam area AFP of the out-of-axis focus condition detecting optical system and the exit pupil outer radius Po at an exit pupil position Pz far different from the AF pupil position Ps are to be considered.

The deformed exit pupil outer radiums Po defined in this manner is utilized for judgment of a distance measuring area only in an out-of-axis distance measuring frame. An example of the same is shown in Table 3. The differences from the selection of distance measuring areas in an on-axis distance measuring frame indicated in Table 1 are:

(1) that, in the case of a photographing lens wherein the exit pupil position Pz is small, an eclipse will readily appear in an AF beam of light even if the deformed exit pupil outer radius Po is large; and (2) that, also in a photographing lens wherein the exit pupil position Pz is displaced by a great distance from the AF pupil position Ps, an eclipse will readily appear in the AF beam of light because the AF beam of light is displaced to a great extend from the optical axis as seen in FIG. 7 and also because the value k itself increases.

Similar arguments will be approved for the exit pupil inner radium Po' for selecting an out-of-axis distance measuring area if the deformed exit pupil inner radius Po' is defined as $Po' = P0' + k' \cdot \Delta Po +$ ($0 \leq k' \leq 1$) and Po mentioned hereinabove is replaced by the Po'. FIG. 5 indicates an example of selection table for distance measuring areas in an out-of-axis distance measuring frame from an exit pupil position Pz and a deformed exit pupil inner radius Po'.

Figure 10:
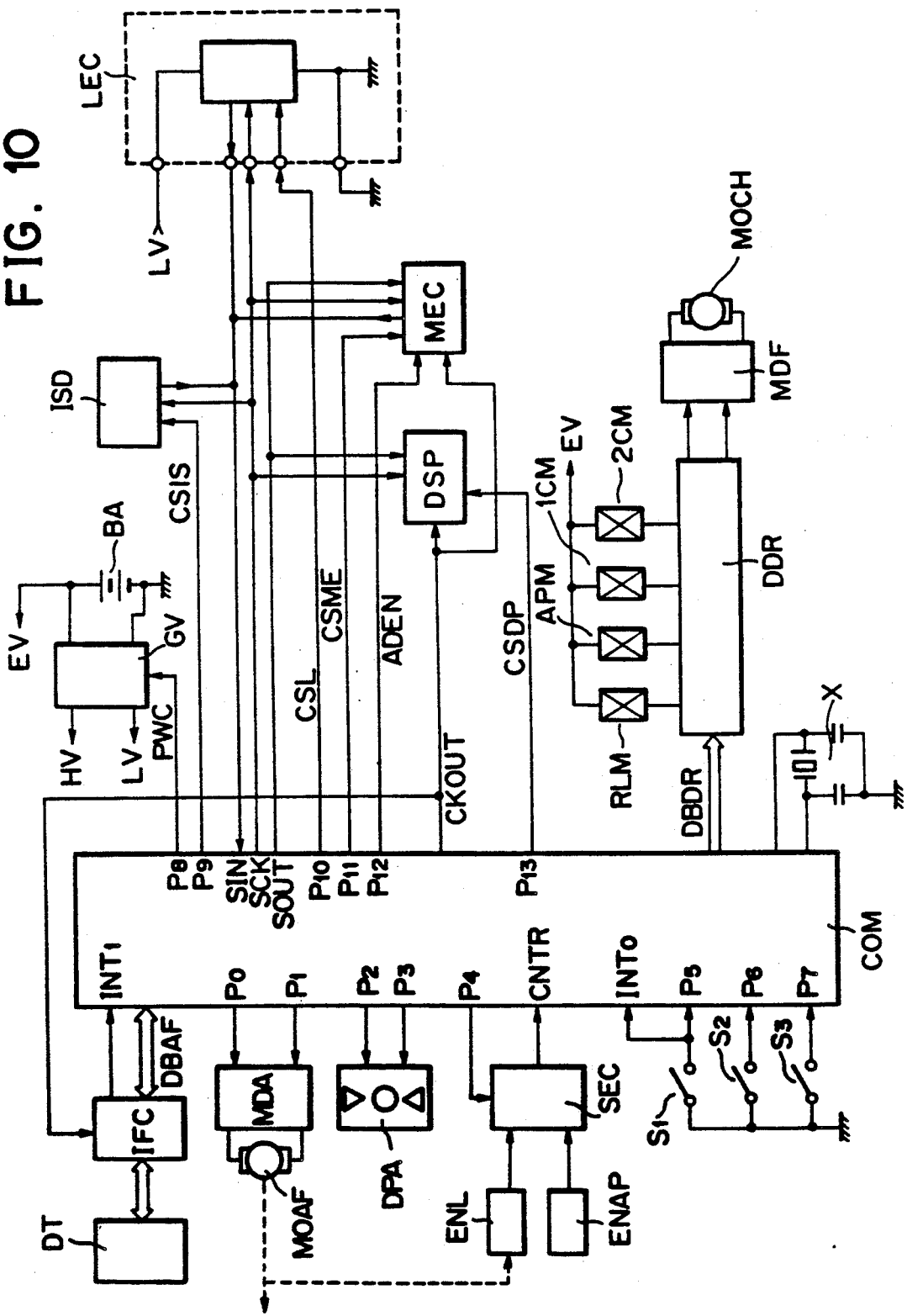
FIG. 10 is a circuit diagram of a camera system in which the focus condition detecting device of FIG. 3 is employed.

FIG. 10 is a circuit diagram of a camera system to which the present invention is applied. The camera system includes a focus condition detecting light receiving device DT having three CCD image pickup element arrays 16a, 16b and 16c shown in FIG. 3. The camera system further includes an interface circuit IFC for controlling operation of the CCD image pickup element arrays of the focus condition detecting light receiving device DT. The interface circuit IFC has a function of converting analog signals read from the CCD image pickup element arrays into digital signals and transmitting the thus converted digital signals to a microcomputer COM via a data bus DBAF, and another function of transmitting completion of a charge accumulating operation of the CCD image pickup element arrays to an interrupt input terminal $INT_1$ of the microcomputer COM. It is to be noted that the charge accumulating time to the CCD image pickup element arrays is controlled by an output of another light receiving means not shown for monitoring the brightness of an object.

The camera system further includes a lens feeding motor MOAf for automatic focusing, and a motor controlling circuit MDA which receives signals from output ports $P_0$ and $P_1$ of the microcomputer COM and controls the lens driving motor MOAf to rotate forwardly or reversely or be braked or stopped. The camera system includes a display device DPA which receives signals from output ports $p_2$ and $p_3$ of the microcomputer COM and makes an indication of a moving direction of the lens and an indication of a focus condition or a warning that detection of a focus condition is impossible.

The camera system further includes an encoder ENL for producing pulses with which the amount of the lens fed by the lens driving motor MOAF (amount of rotation of the motor) is to be monitored, and another encoder ENAP for producing pulses with which the aperture value of the lens is to be monitored. A data selector SEC delivers pulses from the AF encoder ENL when an output port $p_4$ of the microcomputer COM is at a "Low" voltage level, but delivers pulses from the aperture encoder ENAP when the output port $p_4$ is at a "High" voltage level, to an input terminal CNTR of the microcomputer COM for an event counter. The event counter is provided within the microcomputer COM. A data is preset to the event counter, and each time a pulse is delivered to the terminal CNTR, the contents of the event counter are decremented by one, and when the contents are reduced to zero, an interruption takes place at the microcomputer COM.

A light measuring switch $S_1$ is closed when a release button is depressed to a first depth or position, and the closing signal of the light measuring switch $S_1$ is delivered to another interrupt input terminal $INT_0$ and input port $p_5$ of the microcomputer COM. A release switch $S_2$ is closed when the release button is depressed to a second deeper position. The closing signal of the release switch $S_2$ is delivered to an input port $p_6$ of the microcomputer COM. A reset switch $S_3$ is closed upon completion of an exposure controlling operation and is opened upon completion of winding or charging of a film. The closing signal of the reset switch $S_3$ is delivered to an input port $p_7$ of the microcomputer COM.

A power source circuit GV operates when a power source controlling signal PWC delivered from an output port $p_8$ of the microcomputer COM is at the "Low" level. The power source circuit GV delivers a high voltage HV and a low voltage LV from an output power of power source batteries BA. The high voltage HV makes a power source to the light receiving device DT and the interface circuit IFC. Meanwhile, the low voltage LV makes a power source to the aforementioned display device DPA, encoders ENL and ENAP, data selector SEC, and a film sensitivity reading circuit ISD, a lens circuit LEC, a light measuring and analog to digital converting circuit MEC and a decoder driver DDR which will be hereinafter described. To the contrary, the motor controlling circuits MDA and MDF, display device DSP and microcomputer COM receive supply of a power directly from the power source batteries BA over a power source line EV.

The film sensitivity reading circuit ISD reads an ISO data indicative of a sensitivity of the film on a film container and delivers the film sensitivity data serially to a serial input terminal SIN of the microcomputer COM in synchronism with serial clocks SCK from the microcomputer COM when a film sensitivity reading circuit selecting signal CSIS from an output port $p_9$ of the microcomputer COM is changed to the "Low" level. The lens circuit LEC is provided in an interchangeable lens and has such a circuit construction as, for example disclosed in Japanese Patent Laid-Open No. 59-140408. When a lens circuit selecting signal CSL from an output port $p_{10}$ is changed to the "Low" level, various data stored in a ROM (read only memory) in the lens circuit LEC are transmitted serially to the serial input terminal SIN in synchronism with the serial clocks SCK. Here, the data fixedly stored in the ROM in the lens circuit LEC will be described separately for a fixed focal length lens and a zoom lens.

TABLE 5

| (Stored Contents of Built-in ROM of Fixed Focal Length Lens) | |
|---|---|
| Address | Data |
| 01 | Mounting Signal (ICP) |
| 02 | Open Aperture Value (Avo) |

TABLE 5-continued (Stored Contents of Built-in ROM of Fixed Focal Length Lens)

| Address | Data |
| --- | --- |
| 03 | Maximum Aperture Value (Avmax) |
| 04 | Focal Length (f) |
| 05 | Converting Coefficient (K) |
| 06 | Aperture Changing Amount ($\Delta Av = 0$) |
| 07 | Exit Pupil Position (Pz) |
| 08 | Exit Pupil Outer Radius (Po) |
| 09 | Exit Pupil Inner Radius (Po') |
| 0A | Outside Image Height Correcting Data ($\Delta$Po) |
| 0B | Inside Image Height Correcting Data ($\Delta$Po') |

TABLE 6

(Stored Contents of Built-in ROM of Zoom Lens)

| Address | Data |
| --- | --- |
| 01 | Mounting Signal (ICP) |
| 02 | Open Aperture Value (Avo) |
| 03 | Maximum Aperture Value (Avmax) |
| 10-1F | Focal Length (f) |
| 20-2F | Converting Coefficient (K) |
| 30-3F | Aperture Changing Amount ($\Delta$Av) |
| 40-4F | Exit Pupil Position (Pz) |
| 50-5F | Exit Pupil Outer Radius (Po) |
| 09 | Exit Pupil Inner Radius (Po' = 0) |
| 60-6F | Outside Image Height Correcting Data ($\Delta$Po) |
| 0B | Inside Image Height Correcting Data ($\Delta$Po' = 0) |

Table 5 and Table 6 indicate stored contents of ROMs built in lenses in the case of a fixed focal length lens and a zoom lens, respectively. A data common to all of the lenses is fixedly stored as a mounting signal ICP at a location of the address 01 of the ROM. At locations of the addresses 02 and 03, a fully open aperture value Avo and a maximum aperture value Avmax are stored fixed, respectively. In the case of a zoom lens wherein the aperture value is varied by zooming, such aperture values at the shortest focal length are fixedly stored at the locations. Meanwhile, in the case of a cata-dioptric lens, Avo=Avmax because the aperture is fixed. A data of the focal length f is stored at a location of the address 04 in the case of a fixed focal length lens, and data of the focal lengths f are stored at locations of the addresses 10 to 1F. It is to be noted that the lower 4 bits 0 to F of the addresses equal to or higher than 10 in the case of a zoom lens are specified by a signal obtained from a zoom encoder upon zooming. At a location or locations of the address 05 or addresses 20 to 2F, a coefficient or coefficients K with which a defocus amount is to be converted into a driving amount of the lens driving motor MOAF are stored. At a location or locations of the address 06 or addresses 30 to 3F, a data or data of a changing amount or amounts $\Delta$Av of the aperture value of the zoom lens changed upon zooming are stored, and in the case of a fixed focal length lens, $\Delta$Av=0. At a location or locations of the address 07 or addresses 40 to 4F, a data or data of an exit pupil position Pz are stored while a data or data of an exit pupil outer radius Po are stored at a location or locations of the address 08 or addresses 50 to 5F. At a location of the address 09, a data of an exit pupil inner radius Po' is stored, and in the case of a lens other than a cata-dioptric lens, Po'=0. An outside image height correcting data or data $\Delta$Po are stored at a location or locations of the address 0A or addresses 60 to 6F while an inside image height correcting data $\Delta$Po' is stored at a location of the address 0B. In the case of a lens other than a cata-dioptric lens, the inside image height correcting data $\Delta$Po' is $\Delta$Po'=0.

The display circuit DSP makes an indication of display data transmitted from the microcomputer COM. The light measuring and analog to digital converting circuit MEC operates its light measuring operation when supply of power of the low voltage LV from the power source circuit GV is started, and then when an analog to digital conversion enabling signal ADEN from an output port $p_{12}$ of the microcomputer COM is changed to the "Low" level, analog to digital conversion is repeated at a predetermined cycle. Then, when a light measuring and analog to digital converting circuit selecting signal CSME from an output port $p_{11}$ is changed to the "Low" level, digital data latched are delivered to the microcomputer COM in synchronism with serial clocks SCK. A load driving circuit DDR decodes a data transmitted thereto from the microcomputer COM over a data bus DBDR and drives loads in accordance with the decoded results. The loads may include a release magnet RLM, an aperture controlling magnet APM, a leading screen controlling magnet 1CM, a trailing screen controlling magnet 2CM, a motor MOCH for feeding a film and for charging an exposure controlling mechanism, and a driver MDF for the motor MOCH. The camera system further includes an oscillator X.

Operation of the camera system will be described below with reference to flow charts of FIGS. 11a to 17. In the following description, the mark "#" denotes a number of a step of a program of the microcomputer COM.

If the release button is operated, the light measuring switch $S_1$ is closed when the release button is moved to its first position. Thereupon, an interrupt signal is received at the interrupt input terminal $INT_0$ of the microcomputer COM. Consequently, the microcomputer COM starts its operation from an interrupt routine $INT_0$ illustrated in FIG. 11a. Referring to FIG. 11a, the microcomputer COM changes, at first at step #1, the power source controlling signal PWC to be delivered from the output port $p_8$ thereof to the "Low" level to render the power source circuit GV operative. Then, at step #2, the microcomputer COM outputs reference clocks CKOUT to the interface circuit IFC, display circuit DSP and light measuring and analog to digital converting circuit MEC, and then executes, at step #3, initialization of the CCDs of the image pickup element arrays to sweep out the charge accumulated in the CCDs. Subsequently, a charge accumulating operation of the CCDs is started at step #4, and upon completion of the charge accumulating operation, reception of an interrupt signal at the interrupt input terminal $INT_1$ is enabled at step #5, whereafter the analog to digital conversion enabling signal ADEN from the output port $p_{12}$ is changed to the "Low" level to allow conversion of a measured light value from an analog to a digital value at step #6.

Subsequently, a light measuring routine is executed. In the light measuring routine, a lens data and a film sensitivity data (ISO data) are first read in from an interchangeable lens and a film container at steps #7 and #8, respectively. After then, states of flags $IFF_1$ and $IFF_2$ are discriminated at steps #9 and #10. The flag $IFF_1$ is set to "1" when an in-focus condition is reached, and the other flag $IFF_2$ is set when a light measuring data is fetched into the microcomputer COM after an in-focus condition has been reached. Accordingly, either when an in-focus condition is not yet reached or when a measured light data is not yet fetched in whereas an in-focus condition is already reached, the measured light data is fetched in at step #11, and then in case the data is fetched in after an in-focus condition has been reached (step #12), the flag $IFF_2$ is set to "1" at step #13 whereafter the sequence advances to a calculation routine. To the contrary, when the flags $IFF_1$ and $IFF_2$ are both "1" at steps #9 and #10, respectively, then the microcomputer COM advances the sequence directly to the calculation routine without receiving input of a measured light data.

Figure 11C:
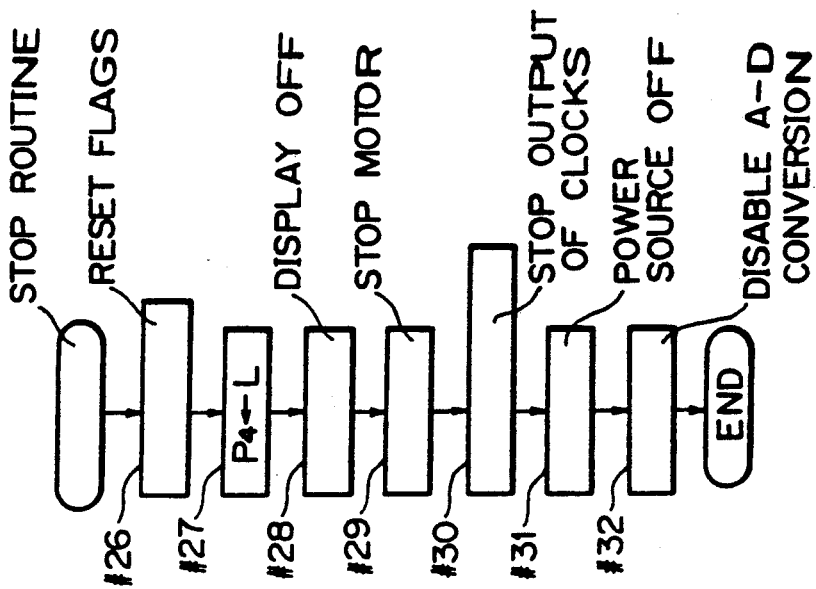
Figure 11B:
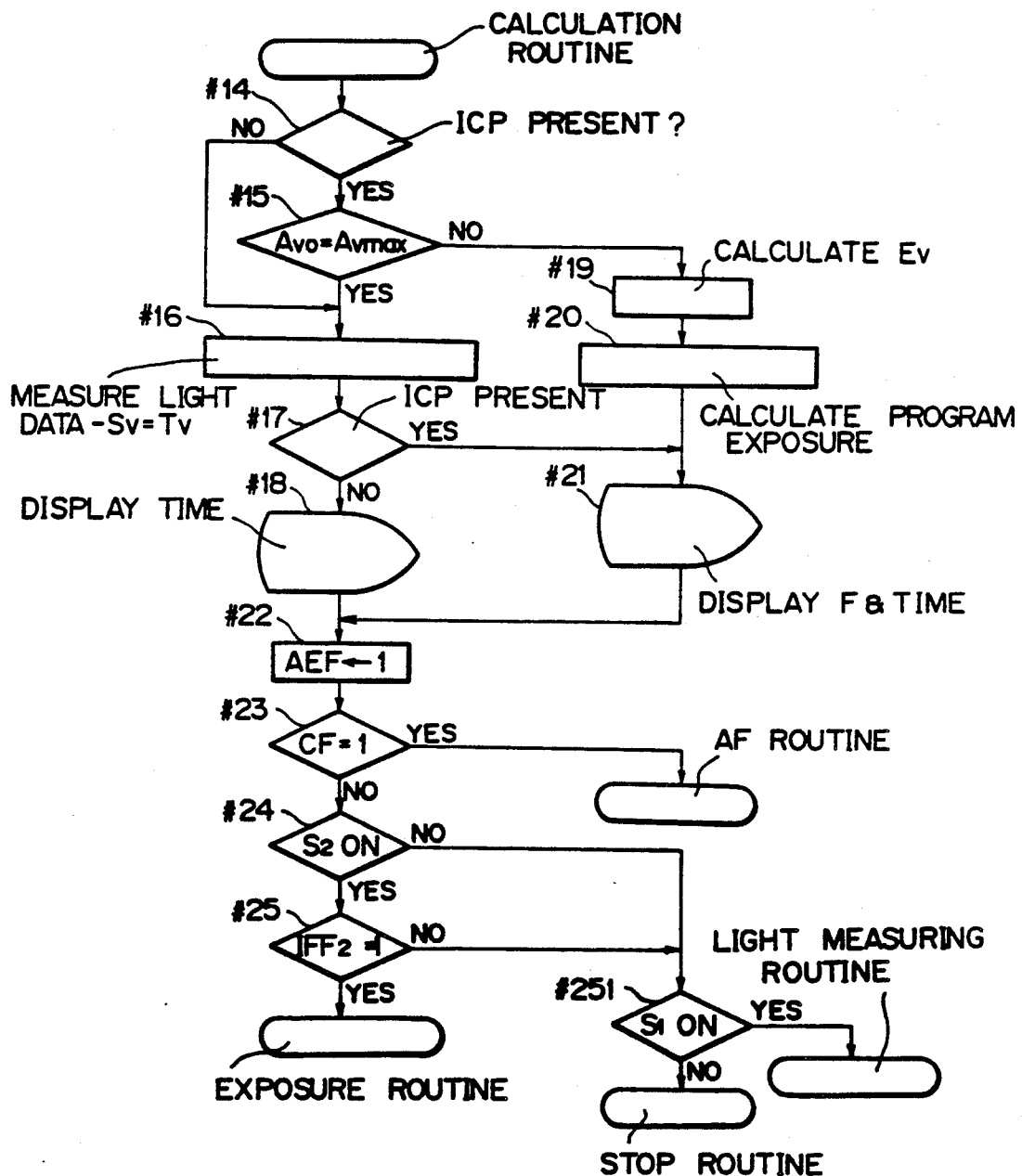

The calculation routine is illustrated in FIG. 11b. In the calculation routine, the microcomputer COM judges at first at step #14 whether or not a mounted lens signal ICP is received, and when a mounted lens signal ICP is received, the sequence advances to sept #15, but when no mounted lens signal ICP is received, the sequence advances to step #16. At step #15, it is judged whether or not the fully open aperture value Avo is equal to the maximum aperture value Avmax (Avo=Avmax). If the lens mounted on the camera is a cata-dioptric lens, then Avo=Avmax, and the sequence thus advances to step #16, but otherwise when Av≠Avmax, this means that the mounted lens is an ordinary interchangeable lens or an ordinary dioptric lens and the sequence thus advances to step #19. When no lens is mounted or when a cata-dioptric lens is mounted, aperture control is naturally impossible and hence the aperture must be considered fixed. Thus, at step #16, an ISO value Sv indicative of a sensitivity of a film is added to a measured light data=BV−Av (Bv is a brightness of an object, and Av is a fixed aperture value) to find an exposure time Tv. Then at step #17, it is judged whether or not there is a lens mounted on the camera, and if no lens is mounted, then the exposure time is displayed while the F-number is displayed as a warning pattern (for example, "——") at step #18. To the contrary, when it is judged at step #17 that a lens is mounted, the lens here is a cata-cioptric lens, and accordingly at step #21, the calculated exposure time Tv and the fixed aperture value (fully open aperture value Avo=maximum aperture value Avmax). In case it is judged at step #15 that the lens mounted is not a cata-dioptric lens, then Avo+ΔAv+Sv is added to the measured light data=Bv−(Avo+ΔAv) to find an exposure value Ev at step #19. After then, at step #20, a programmed exposure calculation is executed based on the exposure value Ev to fine an aperture value Av and an exposure time Tv, whereafter the aperture value Av and the exposure time Tv are displayed at step #21.

After completion of the operation described above, a flag AEF is set to "1" at step #22. The flag AEF is a flag which is set to "1" if an exposure calculation is completed. Then, a flag CF is checked at step #23, and then if the flag CF is CF=1, then the sequence advances to an AF routine illustrated in FIG. 12b. The flag CF is provided to advance the sequence from step #23 to the AF routine after the remaining exposure calculation after data from the CCD has been fetched into the microcomputer COM at once if an exposure calculation is not yet completed upon completion of a charge accumulating operation of the CCDs during operation of the light measuring routine or the calculation routine.

In case the flag CF is not CF=1 at step #23, then the sequence advances to step #24 at which it is judged whether or not the release switch $S_2$ is closed and then to step #25 at which it is judged whether or not an exposure controlling value has been calculated from a measured light data after reaching of an in-focus condition. In case the conditions are met at both steps #24 and #25, the sequence advances to an exposure controlling routine illustrated in FIGS. 13a and 13b in order to effect an exposure controlling operation.

To the contrary, if either one of the conditions is met at step #24 or #25, then it is judged at step #251 whether or not the light measuring switch $S_1$ is in a closed condition, and if the light measuring switch $S_1$ is in a closed condition, then the sequence returns to the light-measuring routine beginning with step #7 described above, but on the contrary if the light measuring switch $S_1$ is not in a closed condition, then a following stop routine illustrated in FIG. 11c is executed.

Referring to FIG. 11c, in the stop routine, all flags are reset at first at step #26, and then the output port $p_4$ of the microcomputer COM is changed to the "Low" level at step #27, whereafter a data to render the display device ineffective so that it may display nothing thereon is transmitted to the display circuit DSP at step #28. Subsequently, the motor MOAF is stopped at step #29 and then delivery of the reference clocks CKOUT is stopped at step #30 whereafter the power source circuit GV is rendered inoperative at step #31. After then, the signal ADEN is changed to the "High" level to disable analog to digital conversion at step #32, and finally the microcomputer COM stops its operation.

Referring now to FIGS. 12a to 12c, operation of the AF routine will be described. Upon completion of the charge accumulating operation of the CCDs, an interrupt input signal is received at the interrupt input terminal $INT_1$ of the microcomputer COM from the interface circuit IFC. In response to the interrupt input signal, the microcomputer COM starts its operation of the interrupt routine $INT_1$ beginning with step #39. At first at step #39, it is judged whether or not an interchangeable lens is mounted on the camera, and if the judgment is in the affirmative, the sequence advances to step #40, but on the contrary the judgment is in the negative, the sequence jumps to step #51 of the AF routine of FIG. 12b without executing operations of fetching data from the CCDs into the microcomputer COM, detecting a focus condition or feeding the lens. At step #40, analog signals delivered from the light receiving device DT corresponding to the three arrays of CCDs are converted successively into digital signals at the interface circuit IFC and then fetched into the microcomputer COM. Then at step #41, the flag CF is set to "1", and then at step #42, it is judged whether or not the flag AEF is set to "1". Here, if the flag AEF is "0", this means that the light measuring routine and the calculation routine for the first time are not yet completed. Accordingly, the sequence returns to the step of the return address, that is, the step from which the interrupt routine $INT_1$ is entered. Then, after the light measuring routine and the calculation routine of FIGS. 11a and 11b are completed subsequently, CF=1 is determined at step #23 and consequently the sequence now advances to the AF routine which is illustrated in FIG. 12b and begins with step #43. To the contrary, if AEF=1 is determined at step #42, then the sequence advances directly to the AF routine thus directly after completion of taking in of data of the CCDs.

Referring to FIG. 12b, in the AF routine, at first the flag CF is reset to "o" at step #43, and then the sequence advances to a subroutine SUB1 illustrated in FIG. 14. In the subroutine SUB1, distance measuring areas in which a focus condition can be detected in an on-axis distance measuring frame A are selected based on an exit pupil position Pz and an exit pupil outer radius Po. Then, at step #44, a deformed exit pupil outer radius Po for out-of-axis distance measuring frames B and C is calculated from the exit pupil outer radius Po and the outside image height correcting data ΔPo both from the lens and the constant k of the camera body. Subsequently, the sequence advances to a subroutine SUB2 illustrated in FIG. 15 in which distance measuring areas in which a focus condition can be detected in the out-of-axis distance measuring frames B and C are selected based on the exit pupil position Pz and the deformed exit pupil outer radius Po. After then, at step #45, it is judged whether or not the exit pupil inner radius Po' is Po'=0, and in case Po'=0, the lens is an ordinary lens and accordingly the sequence advances directly to step #47. On the contrary, in case Po'≠0 at step #45, the lens is a cata-dioptric lens and the sequence thus advances to a subroutine SUB3 illustrated in FIG. 16. In the subroutine SUB3, distance measuring areas in which a focus condition can be detected in the on-axis distance measuring frame A are selected based on the data of the exit pupil position Pz and the data of the exit pupil inner radius Po', and thus distance measuring areas which have been selected in the subroutine SUB1 and are selected also in the subroutine SUB3 are finally decided. Subsequently, at step #46, a deformed exit pupil inner radius Po' is calculated from the exit pupil inner radius Po' and the inside image height correcting data ΔPo' both from the lens and the constant k' of the camera body. After then, the sequence advances to a subroutine SUB4 illustrated in FIG. 17 wherein distance measuring areas in which a focus condition can be detected in the out-of-axis distance measuring frames B and C are selected from the exit pupil position Pz and the deformed exit pupil inner radius Po' and then distance measuring areas which have been selected in the subroutine SUB2 and are also selected in the subroutine SUB4 are decided finally. After then, the sequence advances to step #47.

At step #47, it is judged whether or not there is a distance measuring area selected based on the data Pz, Po, Po', Po and Po' regarding the exit pupil, and if there is no distance measuring area selected, the sequence advances to step #51 without executing detection of a focus condition. To the contrary, in case there is at least one distance measuring area selected, detection of a focus condition (detection of a defocus amount) is executed, at step #48, for each of the selected distance measuring areas. Then at step #49, it is judged whether a reliable data has been obtained for each of the distance measuring areas, and those of the distance measuring areas for which a reliable data has not been obtained are removed. Then, it is judged at step #50 whether or not there remains at least one distance measuring area for which a reliable data has been obtained, and when there remains no reliable area, that is, when there is no reliable data, the sequence advances to step #51. At step #51, the flag IFF$_2$ is set to "1" in order that an exposure controlling operation may be enabled whether an in-focus condition is reached or not when detection of a focus condition is impossible. Then at step #52, the display device is caused to make an indication that detection of a focus condition is impossible, whereafter a charge accumulating operation of the CCDs is started at step #53. After then, interruption at the interrupt input INT$_1$ is enabled, and then the sequence returns to the step of the return address in the light measuring routine or the calculation routine.

If it is determined at step #50 that there is at least one reliable data, then the sequence advances to step #60 illustrated in FIG. 12c. Referring now to FIG. 12c, statistic processing is executed at step #60. The statistic processing may include, for example, adoption of a signal for the rearmost focusing or adoption of such a defocus amount that, when a plurality of data are within a predetermined defocus amount, the plurality of objects may fall in the depth of focus. Then, it is judged at step #61 whether or not the defocus amount which has been determined in the statistic processing is within an in-focus region, and in case the defocus amount is not within the in-focus region, the sequence advances to step #62, but otherwise if the defocus amount is within the in-focus region, then the sequence advances to step #70. At step #62, the direction of the defocus is displayed, and then at step #63, the defocus amount is multiplied by a converting coefficient K to find an amount of the lens feeding motor MOAF to be driven. The amount to be driven is preset to the event counter EVC at step #64. Then, interruption of the event counter is enabled at step #65, and then the lens driving motor MOAF is rendered operative at step #66. Finally, the sequence returns to the step of the return address in the light measuring routine or the calculation routine. After then, the light measuring routine and the calculation routine are repeated while feeding the lens. During the cycles, pulses from the encoder ENL with which the amount of the lens being fed is to be monitored are delivered to the event counter via the selector SEC and the terminal CNTR of the microcomputer COM so that the contents of the event counter EVC are decremented successively.

If the contents of the event counter EVC are reduced to "0", then operation of the microcomputer COM is interrupted by the event counter (EVC interrupt). Consequently, the microcomputer COM executes the EVC interrupt routine of FIG. 13c beginning with step #100. At step #100, it is judged whether or not the camera is proceeding an AF operation. Since here the camera is proceeding an AF operation, the sequence advances to step #101 at which the motor MOAF is stopped and then to step #102 at which a charge accumulating operation of the CCDs is started in order to subsequently permit detection of a focus condition for confirmation. Then, interruption at the interrupt input terminal INT$_1$ is enabled at step #103, whereafter the sequence enters the light measuring routine of FIG. 11a beginning with step #7. It is to be noted that the step #104 in the EVC interruption routine will be hereinafter described.

It is judged at step #61 in the flow chart of FIG. 12c that an in-focus condition is reached, the sequence advances to step #70 at which the display device makes an indication of such an in-focus condition. Then at step #71, the flag IFF$_1$ is set to "1", and then the sequence enters the light measuring routine beginning with the step #7. Accordingly, once an in-focus condition is confirmed, neither detection of a focus condition nor actuation of the lens will thereafter be effected so far as the light measuring switch S$_1$ remains in a closed condition.

Figure 13B:
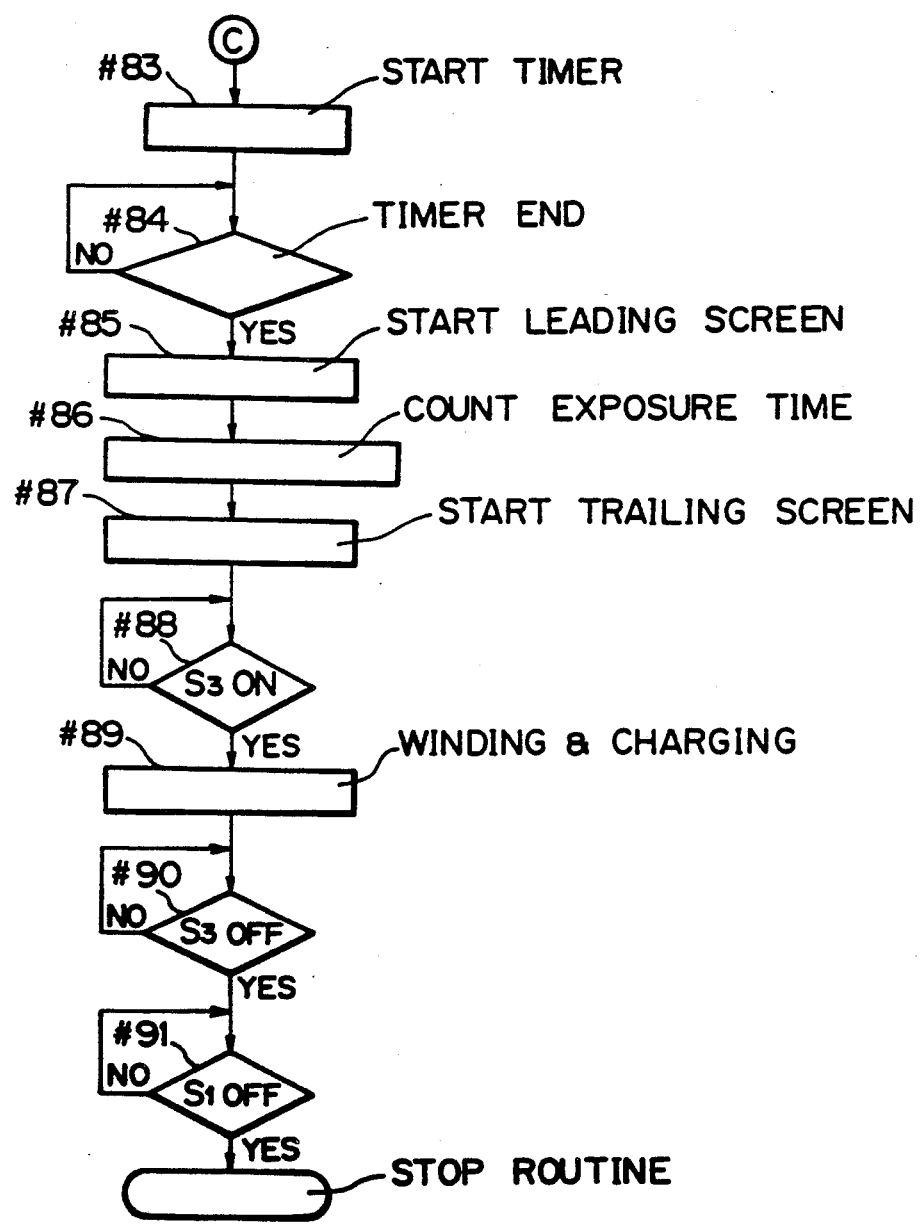

If it is judged at step #24 that the release switch S$_2$ is closed and then judged at step #25 that the flag IFF$_2$ is set to "1", the sequence enters exposure controlling routine illustrated in FIGS. 13a and 13b. Referring firs to FIG. 13a, in the exposure controlling routine, at first the AF indication is turned off at step #75, and then at step #76, the release magnet RLM is energized to start operation of the exposure controlling mechanism. Then, it is judged at step #77 whether or not there is an interchangeable lens mounted on the camera and successively at step #78 whether or not the interchangeable lens, if mounted, is a cata-dioptric lens. In case it is judged that no lens is mounted or a cata-dioptric lens is mounted on the camera, the sequence jumps to step #83 shown in FIG. 13b without making a stopping down controlling operation. To the contrary, if an ordinary lens is mounted on the camera, then the sequence advances from step #78 to step #79 at which it is judged whether or not the controlling aperture value Av is equal to the fully open aperture value Avo, and if Av-=Avo, then the sequence jumps similarly to step #83. To the contrary, if Av≠Avo, then the number of steps to be stopped down (Av-Avo) is set to the event counter EVC at step #80, and then at step #81, the port p4 of the microcomputer COM is changed to the "High" level to allow pulses from the encoder ENAP, with which the amount to be stopped down is to be monitored, to be delivered from the selector SEC. After then, interruption by the timer is enabled at step #82. Referring now to FIG. 13b, the timer is starter subsequently at step #83, and then at step #84, the microcomputer COM waits for a predetermined period of time. During the predetermined period of time, a stopping down operation is performed, and if operation of the microcomputer COM is interrupted by the event counter EVC, then the sequence thus enters the EVC interrupt routine of FIG. 13c. Thus, in the EVC interrupt routine, the stopping down magnet APM is rendered operative at step #104 to stop the stopping down operation. Then, since upward movement of the main mirror has been completed when the predetermined period of time elapses at step #84, the leading screen magnet 1CM is rendered operative at step #85 to start movement of the leading screen, and then the exposure time is counted at step #86. When the counting of the exposure time comes to an end, the trailing screen 2CM is rendered operative to start movement of the trailing screen at step #87. Then at step #88, the microcomputer COM waits until the movement of the trailing screen is completed and the reset switch $S_3$ is turned on. After turning on of the reset switch $S_3$, the charging motor MOCH is rendered operative at step #89 to effect winding of a film and charging of the exposure controlling mechanism, and then the microcomputer COM waits at step #90 until the film winding operation and the charging operation are completed and the reset switch $S_3$ is turned off. After turning off of the reset switch $S_3$, the microcomputer COM waits at step #91 until a finger of an operator is released from the release button and the light measuring switch $S_1$ is turned off. After turning off of the light measuring switch $S_1$, the microcomputer COM enters the stop routine of FIG. 11c. Consequently, the microcomputer COM stops its operation until the light measuring switch $S_1$ is subsequently turned on.

The subroutines SUB1, SUB2, SUB3 and SUB4 shown in FIG. 12b are illustrated in detail in FIGS. 14, 15, 16 and 17, respectively. In the subroutine SUB1 of FIG. 14, a distance measuring area or areas are selected from within the on-axis distance measuring frame A depending upon an exit pupil position Pz and an exit pupil outer radius Po in accordance with Table 1. Referring to FIG. 14, at first at step #110, $Po<Po_1$ is judged, and in case $Po<Po_1$, this means that there is no distance measuring frame in which a focus condition can be detected, and the sequence thus jumps to step #128. To the contrary, in case $Po\geq Po_1$, $Po<Po_2$ is judged subsequently at step #111, and in case $Po_2>Po\geq Po_1$, then $V_{11}$ is set into an address register $Y_{1i}$ at step #112. Similarly, in case $Po_3>Po\geq Po_2$ at step #113, $Y_{12}$ is set into the address register $Y_{1i}$ at step #114, and then in case $Po_4>Po\geq Po_3$ at step #115, $Y_{13}$ is set into the address register $Y_{1i}$ at step #116. But when $Po\geq Po_4$ at step #115, $Y_{14}$ is set into the address register $Y_{1i}$.

After setting of the address $Y_{11}$, $Y_{12}$, $Y_{13}$ or $Y_{14}$ into the address register $Y_{1i}$, similar judgment is made for an exit pupil position Pz in accordance with Table 1. Thus, if $Pz>Pz_4$ at step #118, then the sequence jumps to step #128, but on the contrary if $Pz_4>Pz\geq Pz_3$ at step #118, then $X_{14}$ is set into another address register $X_{1i}$ at step #120. Then if $Pz_3>Pz\geq Pz_2$ at step 121, then $X_{13}$ is set into the address register $X_{1i}$ at step #122, and if $Pz_2>Pz\geq Pz_1$ at step #123, then $X_{12}$ is set into the address register $X_{1i}$ at step #124. In case $Pz_1>Pz$ at step #123, $X_{11}$ is set into the address register $X_{1i}$ at step #125. With the settings, any location in Table 1 can be accessed with the address data of the address registers $X_{1i}$ and $Y_{1i}$. With the address data $X_{1i}$ and $Y_{1i}$, the ROM table in which Table 1 is stored is accessed at step #126, and data stored at the location regarding distance measuring areas in which a focus condition can be detected is set to a register ERAR at step #127. The data here includes 4 bits individually representing the distance measuring areas I to IV, and a bit corresponding to a distance measuring area in which detection of a focus condition is possible presents a binary value "1" but a bit corresponding to a distance measuring area in which detection of a focus condition is impossible presents the other binary value "0". Accordingly, if, for example, the address data $X_{11}$ and $Y_{11}$ are set up, then a data "0001" or "0011" will be placed into the register ERAR; if the address data $X_{14}$ and $Y_{13}$ are set up, then a data "0001" or "1001" will be placed into the register ERAR; and if the address data $X_{11}$ and $Y_{14}$ are set up, then a data "1111" will set to the register ERAR. Meanwhile, at step #128, "0000" is set to the register ERAR because there is no distance measuring area in which a focus condition can be detected.

Figure 15:
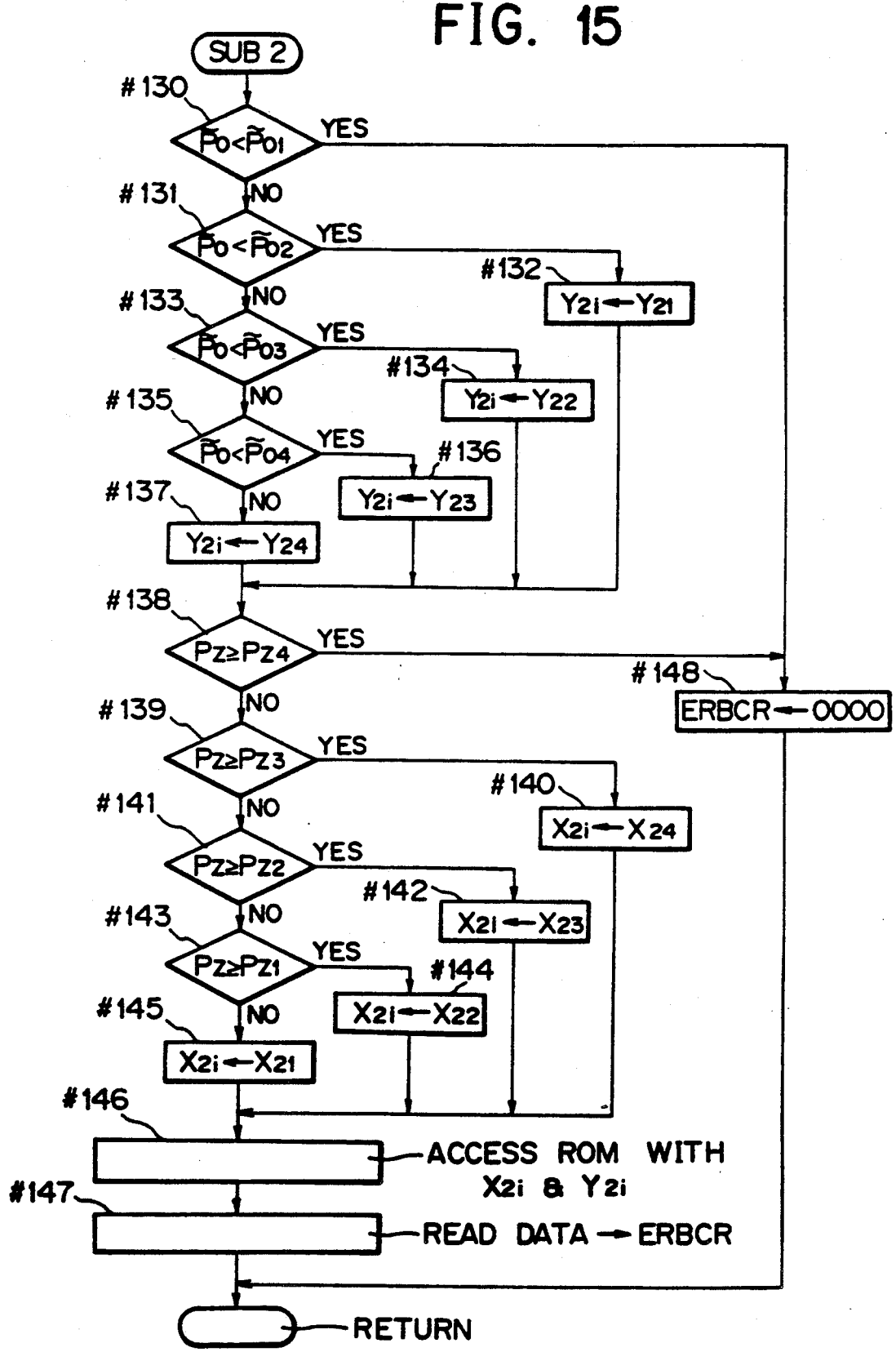

Referring now to FIG. 15, the subroutine SUB2 shown is a flow wherein a distance measuring area or areas in which detection of a focus condition is possible are selected from within the out-of-axis distance measuring frames B and C depending upon an exit pupil position Pz and a deformed exit pupil outer radius Po in accordance with Table 3. Similarly as in the subroutine SUB1 of FIG. 14, when $Po<Po_1$ at step #130 or when $Pz\geq Pz_4$ at step #138, there is no distance measuring area in which a focus condition can be detected. Accordingly, "0000" is set to a register ERBCR. Then, if $Po_1\leq Po<Po_2$ at step #131, then $Y_{21}$ is set into an address register $Y_{2i}$ at step #132, and if $Po_2\leq Po<Po_3$ at step #133, then $Y_{22}$ is set into the address register $Y_{2i}$ at step #134. After then, if $Po_3\leq Po<Po_4$ at step #135, then $Y_{23}$ is set into the address register $Y_{2i}$ at step #136, but if $Po_4\leq Po$ at step #135, then $Y_{24}$ is set into the address register $Y_{2i}$ at step #137. Further, if $Pz_3\leq Pz<Pz_4$ at step #139, then $X_{24}$ is set to another address register $X_{2i}$ at step #140, and the if $Pz_2\leq Pz<Pz_3$ at step #141, then $X_{23}$ is set to the address register $X_{2i}$ at step #142. After then, if $Pz_1 \leq Pz < Pz_2$ at step #143, then $X_{22}$ is set to the address register $X_{2i}$ at step #144, and if $Pz_1 > Pz$ at step #143, then $X_{21}$ is set to the address register $X_{2i}$ at step #145. Then, the ROM table is accessed with the thus set address data $X_{2i}$ and $Y_{2i}$ at step #146, and a data stored at a location thus accessed is set to the register ERBCR.

Figure 16:
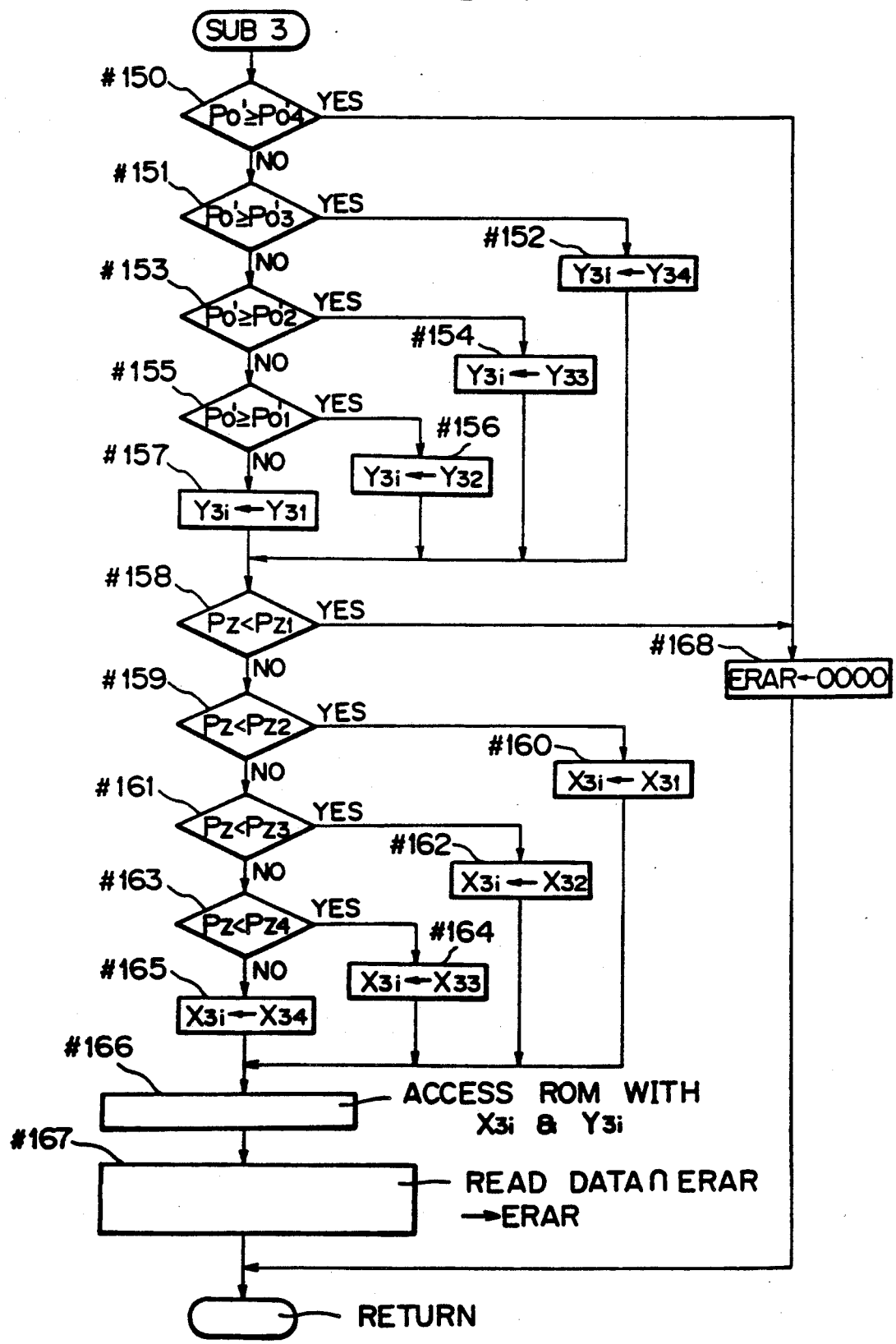

Referring now to FIG. 16, in the subroutine SUB3 shown, a distance measuring area or areas in which a focus condition can be detected are selected from within the on-axis distance measuring frame A depending upon an exit pupil position Pz and an exit pupil inner radius Po' in accordance with Table 2 above, and finally a distance measuring area in the on-axis distance measuring frame A in which a focus condition can be detected is selected depending upon both of the exit pupil outer radius Po and the exit pupil inner radius Po'. At first, in accordance with Table 2, address data $X_{3i}$ and $Y_{3i}$ are determined similarly as in the subroutines SUB1 and SUB2 of FIGS. 14 and 15, respectively, at steps #151 to #165. Then, the ROM table is accessed with the address data $X_{3i}$ and $Y_{3i}$ to read out a data stored at a location specified by the address data at step #166. Then at step #167, the data thus read out and the data which has been set to the register ERAR in the subroutine SUB1 are ANDed for each bit, and the results are set to the register ERAR. Consequently, even if a distance measuring area is selected on one hand and accordingly a bit corresponding to the distance measuring area is "1", if the corresponding bit in the resulted data by selection on the other hand is "0", then the bit of the ANDed results will be "0". Thus, a distance measuring area which is determined from both of the exit pupil outer radius Po and the exit pupil inner radius Po' is set to the register ERAR. It is to be noted that since there is no distance measuring area in which a focus condition can be detected when $Po' \geq Po_4'$ or $Pz < Pz_1$, "0000" is placed into the register ERAR at step #168.

Figure 17:
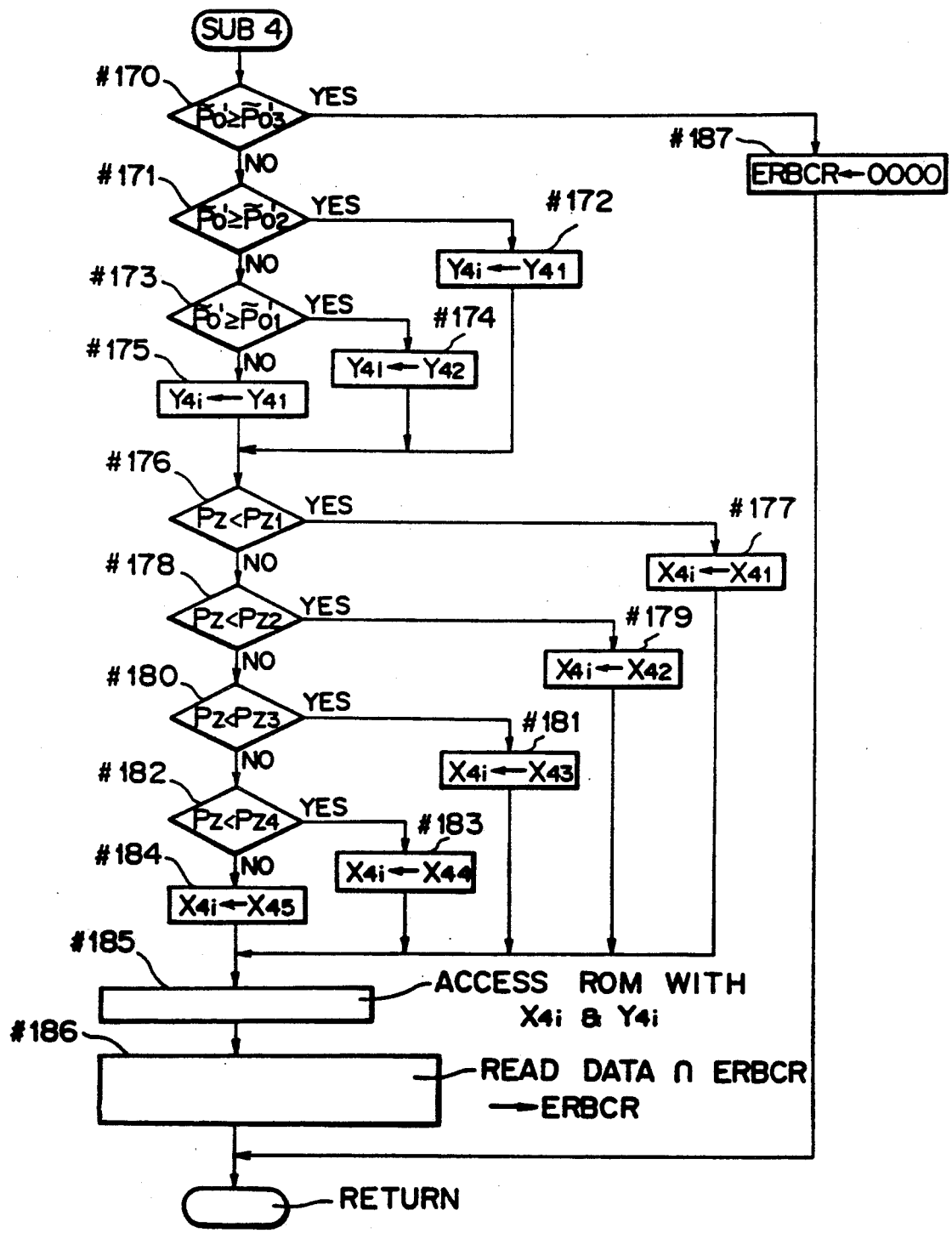

Referring to FIG. 17, in the subroutine SUB4 shown, a distance measuring area or areas in which a focal plane can be detected are selected from within the out-of-axis distance measuring frames B and C depending upon an exit pupil position Pz and a deformed exit pupil inner radius Po' in accordance with Table 4, and finally a distance measuring area in the out-of-axis distance measuring frames B and C in which a focus condition can be detected is selected depending upon both of the deformed exit pupil outer radius Po and the deformed exit pupil inner radius Po'. At first, address data $X_{4i}$ and $Y_{4i}$ are set similarly as in the subroutines SUB1 to SUB3 to FIGS. 14 to 16, respectively, and then, the ROM table is accessed with the address data $X_{4i}$ and $Y_{4i}$ to read out a data stored at a location specified by the address data at step #166. Then, the data thus read out and the data which has been set to the register ERBCR in the subroutine SUB2 are ANDed for each bit, and the results are set to the register ERBCR. Consequently, a distance measuring area in which detection of a focus condition is possible is finally set to the register ERBCR. It is to be noted that since there is no distance measuring area in which a focus condition can be detected when $Po' \geq Po_3'$, "0000" is placed into the register ERBCR at step #187.

While in the embodiment described above the on-axis distance measuring frame A and the out-of-axis distance measuring frames B and C are provided as distance measuring frames and each of the distance measuring frames A, B and C is separated into the distance measuring areas I to IV, only the distance measuring frames A and B or A and C may otherwise be provided as distance measuring frames. Or else, only the distance measuring frame A may be provided and separated into the several areas as in the embodiment described above. Or otherwise, the three distance measuring frames A, B and C may be provided wherein the distance measuring frame A is separated into the several areas while the distance measuring frames B and C are not separated.

While the P mode (program AE mode) has been described so far as an exposure controlling mode, when a cata-dioptric lens is mounted on the camera, it is necessary to cope with the same in a different manner than with an ordinary lens also in an A mode (aperture priority AE mode), S mode (shutter speed priority AE mode) or M mode (manual mode). In particular, in the case of the A mode, an exposure time is automatically set with respect to a fixed aperture similarly as in the P mode, but in the case of the S mode or M mode, the aperture is fixed and the exposure time is manually set.

Further, while data regarding an exit pupil of an interchangeable lens for allowing judgment therewith of whether detection of a focus condition is possible or not are stored in the interchangeable lens in the embodiment described above, a data representing whether or not detection of a focus condition is possible on the lens may additionally be stored in the lens. With such a modification, the interchangeable lens can cope with a camera which has a conventional focus condition detecting function but does not have a function of judging it depending upon data regarding an exit pupil whether or not detection of a focus condition is possible.

Having now fully described the invention, it will be apparent to one or ordinary skill in the art that many changes and modifications can be made thereto without departing from the spirit and scope of the invention as set forth herein.

What is claimed is:

1. A focus condition detecting device, comprising an objective lens for forming an image and having an exit pupil; optical means for forming a pair of images of an object disposed in an area away from the optical axis of the objective lens, the images being formed from a pair of light beams transmitted through different areas of said exit pupil; a pair of light receiving means for receiving said pair of images thereon; focus condition detecting means for detecting a relative displacement between the pair of images depending upon outputs of said light receiving means to detect a focus condition of said objective lens; and judging means for judging, depending upon data regarding the exit pupil of said objective lens, whether or not it is possible for said focus condition detecting means to effect optically accurate detection of a focus condition from a combination of said optical means and said objective lens.

2. A focus condition detecting device, comprising an objective lens for forming an image and having an exit pupil; optical means for forming a pair of images of an object disposed in an area away from the optical axis of the objective lens, the images being formed from a pair of light beams transmitted through different areas of said exit pupil; detecting means for detecting a focus condition of said objective lens depending upon said pair of images; and means for judging, depending upon data of said objective lens, whether or not detection of a focus condition of said objective lens by said detecting means is possible.

3. A focus condition detecting device, comprising; an objective lens for forming an image and having an exit pupil; optical means for forming a pair of images from a pair of bundles of light transmitted through different areas of said exit pupil, images of the pair of bundles of light being formed at a position exclusive of an optical axis by the objective lens; a pair of light receiving means for receiving the pair of images thereon; focus condition detecting means for detecting a relative displacement between the pair of images depending upon outputs of said light receiving means to detect a focus condition of said objective lens; and judging means for judging, depending upon data regarding the exit pupil of said objective lens, whether or not it is possible for said focus condition detecting means to effect optically accurate detection of a focus condition from a combination of said optical means and said objective lens.

4. A focus condition detecting device, comprising; an objective lens for forming an image and having an exit pupil; optical means for forming a pair of images from a pair of bundles of light transmitted through different areas of said exit pupil, images of the pair of bundles of light being formed at a position exclusive of an optical axis by the objective lens; detecting means for detecting a focus condition of said objective lens depending upon said pair of images; and means for judging, depending upon data of said objective lens, whether or not detection of a focus condition of said objective lens by said detecting means is possible.

5. A focus condition detecting device, comprising; an objective lens for forming an image and having an exit pupil; optical means for forming a pair of images from a pair of bundles of light transmitted through different areas of said exit pupil, the pair of bundles of light not being symmetric with respect to an optical axis of said objective lens but being symmetric with respect to a plane including an optical axis of said objective lens; a pair of light receiving means for receiving the pair of images thereon; focus condition detecting means for detecting a relative displacement between the pair of images depending upon outputs of said light receiving means to detect a focus condition of said objective lens; and judging means for judging, depending upon data regarding the exit pupil of said objective lens, whether or not it is possible for said focus condition detecting means to effect optically accurate detection of a focus condition from a combination of said optical means and said objective lens.

6. A focus condition detecting device, comprising; an objective lens for forming an image and having an exit pupil; optical means for forming a pair of images from a pair of bundles of light transmitted through different areas of said exit pupil, the pair of bundles of light not being symmetric with respect to an optical axis of said objective lens but being symmetric with respect to a plane including an optical axis of said objective lens; detecting means for detecting a focus condition of said objective lens depending upon said pair of images; and means for judging, depending upon data of said objective lens, whether or not detection of a focus condition of said objective lens by said detecting means is possible.

* * * * *